(12) United States Patent
Yoshioka et al.

(10) Patent No.: US 7,079,583 B2
(45) Date of Patent: Jul. 18, 2006

(54) MEDIA PROCESSING APPARATUS WHICH OPERATES AT HIGH EFFICIENCY

(75) Inventors: Kosuke Yoshioka, Neyagawa (JP); Makoto Hirai, Suita (JP); Tokuzo Kiyohara, Osaka (JP); Kozo Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1081 days.

(21) Appl. No.: 10/007,248

(22) Filed: Oct. 24, 2001

(65) Prior Publication Data

US 2002/0041626 A1 Apr. 11, 2002

Related U.S. Application Data

(62) Division of application No. 09/055,583, filed on Apr. 6, 1998, now Pat. No. 6,310,921.

(30) Foreign Application Priority Data

Apr. 7, 1997 (JP) .................................. 9-88523

(51) Int. Cl.
*H04N 7/12* (2006.01)
(52) U.S. Cl. ............. 375/240.26; 375/240; 375/240.01
(58) Field of Classification Search ................ 375/240, 375/240.01, 240.12, 240.24, 240.25, 240.26; 382/233
See application file for complete search history.

(56) References Cited

U.S. PATENT DOCUMENTS 5,442,747 A 8/1995 Chan et al.
5,649,029 A * 7/1997 Galbi .......................... 382/233
5,784,119 A 7/1998 Noda et al.
5,946,052 A 8/1999 Ozkan et al.

FOREIGN PATENT DOCUMENTS

EP 503956 9/1992
EP 572263 5/1993

(Continued)

OTHER PUBLICATIONS

"Achievement of Real Time Decoding Supporting HDTV," Nikkei Electronics No. 603, Mar. 14, 1994.

*Primary Examiner*—Allen Wong

(57) ABSTRACT

A media processing apparatus is made up of an I/O processing unit for performing input/output processing which asynchronously occurs due to an external factor and a decode processing unit for performing decode processing mainly for decoding of data streams stored in a memory in parallel with the input/output processing. The input/output processing includes receiving the data streams which are asynchronously inputted, storing the inputted data streams in the memory, and supplying the data streams from the memory to the decode processing unit. The decode processing unit is made up of a sequential processing unit mainly performing condition judgements on the data streams and a routine processing unit performing decode processing on compressed video data aside from header analysis of the compressed video data in parallel with the sequential processing. Accordingly, the input/output processing means and the decode processing means are respectively charged with the asynchronous processing and the decode processing, and the input/output processing means and the decode processing means operate in parallel as in pipeline processing. As a result, the decode processing means can be devoted to the decode processing, regardless of asynchronous processing. Accordingly, processes including input processing of stream data, decode processing of the inputted data, and output processing of decoded data are executed efficiently.

51 Claims, 23 Drawing Sheets

FOREIGN PATENT DOCUMENTS

| | | |
|---|---|---|
| EP | 639032 | 2/1995 |
| EP | 703712 | 3/1996 |
| EP | 751486 | 1/1997 |
| JP | 6326615 | 11/1994 |
| JP | 8111642 | 4/1996 |
| JP | 937249 | 2/1997 |

* cited by examiner

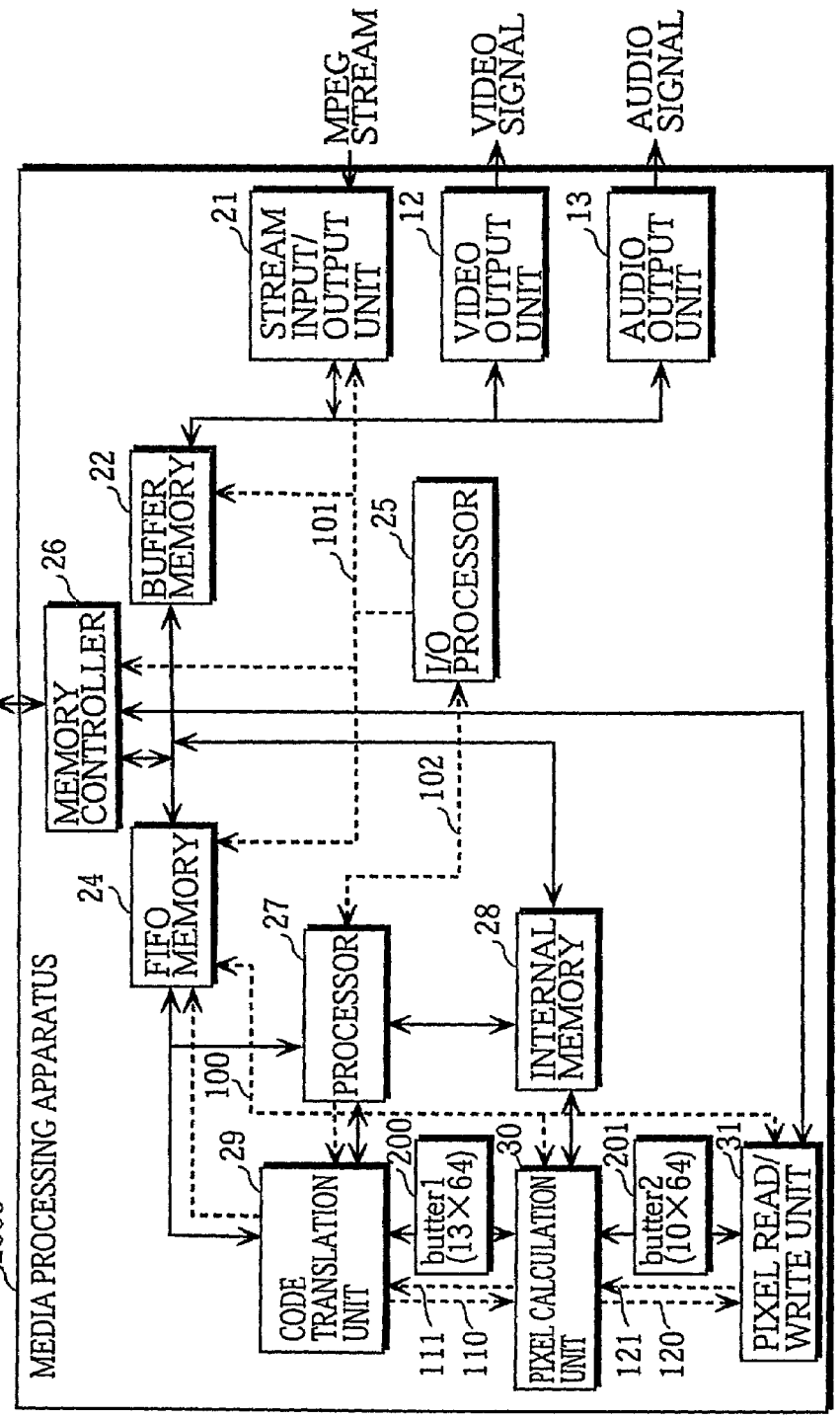

ZIGZAG SCAN

ALTERNATE SCAN

MEDIA PROCESSING APPARATUS WHICH OPERATES AT HIGH EFFICIENCY

This is a divisional application of U.S. Ser. No. 09/055,583, filed on Apr. 6, 1999 now U.S. Pat. No. 6,310,921.

BACKGROUND OF THE INVENTION

1. Field of the Invention

The present invention relates to digital signal processing and in particular to a media processing apparatus which decompresses compressed video data and compressed audio data, and can also compress video data and audio data and perform graphics processing.

2. Description of the Related Art

With the establishment of compressing/decoding techniques for digital video data and the improvements in LSI (Large Scale Integration) technology in recent years, various media processing circuits, such as for a decoder decoding compressed video and audio data, an encoder compressing video and audio data, and graphics processing, have come to be highly valued.

As a first related art, there is an AV (Audio Visual) decoder which decodes video data and audio data compressed according to MPEG (Moving Picture Experts Group) standard (see Japanese Laid-Open Patent Application No. 8-1116429). This AV decoder decodes both video data and audio data using one signal processing unit.

FIG. 1 shows a representation of the decode processing performed by this AV decoder. In FIG. 1, the vertical axis denotes time and the horizontal axis denotes calculation amount.

Taking a larger view along the vertical axis, video data and audio data are alternately decoded since the AV decoder decodes both video data and audio data using the same hardware. As shown in FIG. 1, the operation for the video decoding is divided into sequential processing and block processing. In the sequential processing, non-block data is decoded, that is, various conditions need to be judged, such as for analyzing a header of an MPEG stream. Here, the calculation amount of the sequential processing is small. Meanwhile, in the block processing, variable length codes of the MPEG stream are decoded, and IQ (Inverse Quantization) and IDCT (Inverse Discrete Cosine Transform) are performed in units of blocks. Here, the calculation amount of the block processing is large. The operation for the audio decoding is also divided into sequential processing which requires various condition judgements as in the case with the sequential processing of the video decoding, and decode processing for decoding the core audio data. This decode processing for the core audio data requires higher precision than for decoding the video data, and the processing has to be completed within a limited time. Therefore, the audio data needs to be processed with high precision at high speed, and the calculation amount is large.

Accordingly, the first related art enables the circuitry to be provided on a single chip and realizes an AV decoder which operates at high efficiency using small scale hardware, i.e., one chip.

As a second related art, there is a decoder composed of two chips. One chip is used as a video decoder and the other chip as an audio decoder. FIG. 2 shows a representation of decode processing performed by the decoder composed of two chips. Both the video decoder and the audio decoder perform sequential processing including various condition judgements, such as header analysis, and block processing mainly for decoding the core data. The video decoder and the audio decoder operate independently, so that both chips can be realized using lower performance chips than in the first related art.

However, these related arts have the following drawbacks. By means of the first related art, the signal processing unit has to decode both video data and audio data, so that high performance is required. That is, the signal processing unit needs to operate using a high speed clock whose frequency is over 100 MHz. As a result, the cost is high, making such processing unit unsuitable for a consumer appliances. To improve the performance without using a high speed clock, a VLIW (Very Long Instruction Word) processor can be used. However, VLIW processors are themselves expensive, and the overall processing will be inefficient unless an additional processor is used to perform the sequential processing.

Meanwhile, the second related art also has a drawback in the high cost due to two processors to be used. A common, standard ordinary low priced processor whose performance is low cannot be used as a video processor nor an audio processor. The video processor is required to process a large quantity of image data in real time. Although the audio processor does not need to perform as many calculations as the video processor, higher precision is required for the audio data than for the video data. Therefore, a low priced processor, or a low-performance processor, does not serve the need for the required performance in decoding either of video data and audio data.

When the media processing circuit is used in an AV decoder provided in a digital (satellite) broadcast tuner (called an STB (Set Top Box)) or a DVD (Digital Versatile/Video Disc), MPEG streams received from a broadcast wave or read from a disc are inputted, the MPEG streams are decoded, and video signals and audio signals are respectively outputted to a display and speakers. This series of processes requires a huge amount of processing. For this reason, there has been increasing demand for a media processing apparatus which can efficiently execute this huge amount of processing.

SUMMARY OF THE INVENTION

It is a primary object for the present invention to provide a media processing apparatus which performs a series of processes, that is, inputting stream data representing compressed image data and compressed audio data, decoding the inputted stream data, and outputting the decoded data, with high performance which the media processing apparatus of the present invention can obtain without operating at high frequency, and accordingly, the cost of manufacturing can be reduced.

Moreover, it is a secondary object for the present invention to provide a media processing apparatus which realizes decoding of compressed video data, encoding of video data, and graphics processing at low cost.

To achieve the stated objects, the media processing apparatus of the present invention inputs a data stream including compressed audio data and compressed video data, decodes data in the inputted data stream, and respectively outputs the decoded audio data and the decoded video data to an external display device and an external audio output device, the media processing apparatus can be made up of: an input/output processing means for performing an input/output processing asynchronously occurring due to an external factor, the input/output processing including inputting the data stream which is asynchronously inputted, storing data in the inputted data stream into a memory, and supplying the data stored in the memory to a decode processing means; and the decode processing means which, in parallel with the input/output processing, performs a decode processing where decoding of the data stream stored in the memory is mainly performed, and the decoded video data and the decoded audio data are stored in the memory, and the input/output processing means reads the decoded video data and the decoded audio data from the memory in accordance with respective output rates of an external display device and an external audio output device, and respectively outputs the read video data and the read audio data to the external display device and the external audio output device.

By means of this structure, the input/output processing means and the decode processing means are respectively charged with the asynchronous processing and the decode processing, in addition to that the input/output processing means and the decode processing means operate in parallel as in the pipeline processing. Therefore, the decode processing means can be devoted to the decode processing, regardless of asynchronous processing. Accordingly, a series of processes including input processing of stream data, decode processing of the inputted data, and output processing of decoded data are executed with efficiency, and full decode (with no frame omitted) processing can be realized using no high speed operation clock.

Here, the decode processing means of the media processing apparatus can be made up of: a sequential processing means for performing a sequential processing, which is mainly for condition judgements, on the data in the data stream, the sequential processing including a header analysis of the compressed audio data and the compressed video data and a decoding of the compressed audio data; and a routine processing means for performing a routine processing in parallel with the sequential processing, the routine processing including a decoding of the compressed video data except for the header analysis.

With this structure, the processing efficiency can be considerably improved by resolving the coexistence of the routine processing suitable for the parallel processing and the sequential processing, which have different characteristics, in one unit. The processing efficiency of the routine processing means is especially improved, since the routine processing means of the present media processing apparatus can be devoted to the various routine calculations required for the decode processing of the compressed video data, regardless of the asynchronous processing and the sequential processing. As a result, the media processing apparatus of the present invention can have the high performance using no high speed operation clock.

Here, the input/output processing means of the media processing apparatus can be made up of: an input means for inputting an asynchronous data stream; a video output means for outputting the decoded video data to the external display device; an audio output means for outputting the decoded audio data to the external audio output device; and a processor for executing task programs from a first task program to a fourth task program stored in an instruction memory, by switching between the four task programs, the task programs including: the first task program for transferring the data stream from the input means to the memory; the second task program for supplying the data stream from the memory to the decode processing means; the third task program for outputting the decoded video data from the memory to the video output means; and the fourth task program for outputting the decoded audio data from the memory to the audio output means.

Here, the processor of the media processing apparatus can be made up of: a program counter unit including at least four program counters corresponding to the task programs from the first task program to the fourth task program; an instruction fetch unit for fetching an instruction from the instruction memory which stores the task programs, using an instruction address designated by one of the program counters; an instruction execution unit for executing the instruction fetched by the instruction fetch unit; and a task control unit for controlling the instruction fetch unit to sequentially switch the program counter every time a predetermined number of instruction cycles have elapsed.

By means of this structure, delays in response to data input/output requests can be minimized, regardless of the range of the input rate and the input cycle of the stream data which is determined depending on the external devices and the range of the output rate and the output cycle of the video data and audio data which is determined depending on the external display device and the external audio output device.

A media processing apparatus of the present invention can be made up of: an input means for inputting a data stream including compressed audio data and compressed video data; a sequential processing means for performing a sequential processing which is mainly for condition judgements, the sequential processing including performing a header analysis for analyzing a header which is assigned to a predetermined unit of data (hereinafter, called a "block") in the data stream and performing a decoding of compressed audio data of the data stream; and a routine processing means for performing, in parallel with the sequential processing, a routine processing which is mainly for routine calculations, the routine processing including a decoding of the compressed video data of the data stream for a block using a result of the header analysis, and the sequential processing means instructs the routine processing means to decode the block when the header analysis of the block is completed, and starts the header analysis of a next block when receiving notification from the routine processing means that the decoding of the block is completed.

With this structure, the sequential processing means performs the header analysis which requires the various condition judgements on the compressed video and the compressed audio data as well as performing the decode processing of the compressed audio data. Meanwhile, the routine processing means performs a large amount of routine calculations on the block data of the compressed video data. As such, the processing is shared by the sequential processing means and the routine processing means. The sequential processing means performs the overall decode processing of the audio data where the calculation amount is small as compared with the decode processing of the video data, the header analysis of the compressed video data, and the control of the routine processing means. In accordance with this control by the sequential processing means, the routine processing means is devoted to the routine calculations, so that the processing with high efficiency can be realized with minimum waste. Accordingly, the media processing apparatus of the present invention can obtain the high performance without operating at the high frequency and the cost of manufacturing can be reduced. The sequential processing means sequentially performs the overall decode processing of the audio data, the header analysis of the compressed video data, and the control of the routine processing means. Therefore, it is possible to realize the sequential processing means with one processor.

Here, the routine processing means of the media processing apparatus of the preset invention can be made up of: a data translation means for performing variable length code decoding (abbreviated as the "VLD" hereafter) on the compressed video data of the data stream in accordance with an instruction from the sequential processing means; a calculation means for performing inverse quantization (abbreviated as the "IQ" hereafter) and inverse discrete cosine transformation (abbreviated as the "IDCT" hereafter) by executing a predetermined calculation on a video block obtained through the VLD; and a blending means for restoring video block data by performing motion compensation processing which is achieved by blending the decoded block with the video block on which the IDCT has been performed, and the sequential processing means can be made up of: an obtaining means for obtaining header information on which the VLD has been performed by the data translation means; an analyzing means for analyzing the obtained header information; a notifying means for reporting parameters obtained as a result of the header analysis to the routine processing means; an audio decoding means for decoding the compressed audio data of the data stream inputted by the input means; and a control means for stopping an operation of the audio decoding means, and activating the obtaining means when receiving an interrupt signal from the routine processing means that indicates a decode completion of the block, and for instructing the data translation means to start the VLD on the compressed video data of the data stream when the parameters have been indicated by the notifying means.

By means of this structure, the sequential processing means performs the audio decode processing after performing the header analysis in units of predetermined blocks, such as macroblocks, and starts the header analysis of a next block when the decoding of the block is completed by the routine processing means. Accordingly, the sequential processing means repeats the header analysis and the audio decode processing according to time sharing. As a result, the sequential processing means can be realized at low cost using one processor. In addition, the routine processing means does not need to judge the various conditions, so that it is possible to realize the routine processing means at low cost using special hardware (alternatively, using hardware and firmware).

Here, the calculation means of the media processing apparatus can include a first buffer having a storage area whose capacity is equivalent to one block, and the data translation means can include: a VLD means for performing the VLD on the compressed video data of the data stream; a first address table means for storing a first address sequence where addresses in the first buffer are arranged in an order for a zigzag scan; a second address table means for storing a second address sequence where addresses in the first buffer are arranged in an order for an alternate scan; and a writing means for writing block data obtained through the VLD performed by the VLD means into the first buffer in accordance with one of the first address sequence and the second address sequence.

With this structure, the write means can write the block data into the storage area of the first buffer corresponding to the zigzag scan and the alternate scan. Accordingly, when reading the block data from the storage area of the first buffer, the calculation means does not need to change the order of the read addresses and can always read the read addresses in order regardless of the scan type.

Here, the analyzing means of the media processing can calculate a quantization scale and a motion vector in accordance with the header information, and the notifying means can notify the calculation means of the quantization scale and notifies the blending means of the motion vector.

With this structure, the sequential processing means calculates the motion vectors, and the blending means performs motion compensation as routine processing using the calculated motion vectors.

The calculation means of the media processing apparatus can be made up of: a first control storage unit and a second control storage unit which each store a microprogram; a first program counter for designating a first read address to the first control storage unit; a second program counter for designating a second read address; a selector for selecting one of the first read address and the second read address and outputting the selected read address to the second control storage unit; and an execution unit, which includes a multiplier and an adder, for executing the IQ and IDCT in block units according to microprogram control by the first control storage unit and the second control storage unit.

By means of this structure, the microprogram (the firmware) does not need to judge the various conditions and only have to perform the routine processing, so that the program size can be small and it is easy to create this program. As readily understood, this structure is suitable for the trend towards cost-cutting. In addition, the multiplier and the adder can independently operate in parallel using the two program counters.

The execution unit of the media processing apparatus can separately perform a processing using the multiplier and a processing using the adder in parallel when the second read address is selected by the selector, and perform the processing using the multiplier and the processing using the adder in coordination when the first read address is selected by the selector.

With this structure, waste time of the multiplier and the adder can be reduced, and as a result, the processing efficiency can be improved.

The calculation means of the media processing apparatus can be further made up of: a first buffer for holding a video block inputted from the data translation means; and a second buffer for holding a video block on which the IDCT has been performed by the execution unit, and the first control storage unit stores a microprogram for the IQ and a microprogram for the IDCT, the second control storage unit stores a microprogram for the IDCT and a microprogram for transferring a video block on which the IDCT has been performed to the second buffer, and the execution means executes a processing to transfer the video block on which the IDCT has been performed to the second buffer and the IQ processing of a next video block in parallel, and executes the IDCT processing of the next video block, on which the IQ processing has been performed, using the multiplier and the adder in coordination.

By means of this structure, the IQ and the transfer processing to the second buffer are performed in parallel, so that the processing efficiency can be improved.

The input means of the media processing apparatus can further input polygon data, the sequential processing means can further analyze the polygon data and calculate vertex coordinates and edge inclinations of the polygon, and the routine processing means can further generate image data of the polygon in accordance with the calculated vertex coordinates and edge inclinations.

With this structure, the sequential processing means performs the analysis of the polygon data, and the routine processing means performs the image data generation processing as routine processing. The present media processing apparatus can efficiently perform the graphics processing for generating the image data from the polygon data.

The first control storage unit and the second control storage unit each can store a microprogram for performing a scan conversion based on a digital differential analyze algorithm, and the execution unit can perform the scan conversion based on the vertex coordinates and edge inclinations calculated by the sequential processing means according to control of the microprogram.

By means of this structure, the image data generation can be easily realized by the microprogram for the scan translation stored in the first control storage unit and second control storage unit.

The blending means can further generate a differential block representing a differential image from video data which is to be compressed; the second buffer can store the generated differential block, the first control storage unit can further store a microprogram for discrete cosine transformation (abbreviated as the "DCT" hereafter) and a microprogram for quantization processing (abbreviated as the "Q processing" hereafter), the second control storage unit can further store a microprogram for the DCT and a microprogram for transferring the video block on which the DCT has been performed to the first buffer, the execution means can further execute the DCT and Q processing on the differential block stored in the second buffer and transfers the differential block on which the DCT and Q processing has been performed to the first buffer, the data translation means can further perform variable length coding (abbreviated as the "VLC" hereafter) on the block stored in the first buffer, and the sequential processing means can further assign header information to a block on which the VLD has been performed by the data translation means.

With this structure, the routine processing means performs the Q processing and DCT as the routine processing, and the sequential processing means performs the processing requiring the condition judgements (i.e., the assigning processing of the header information). Here, the present media processing apparatus can execute the encode processing for encoding the image data into the compressed video data using no high speed clock.

The calculation means of the media processing apparatus can be made up of: a first control storage unit and the second control storage unit for respectively storing a microprogram; a first program counter for designating a first read address to the first control storage unit; a second program counter for designating a second read address; a selector for selecting one of the first read address and the second read address and outputting the selected address to the second control storage unit; and a plurality of execution units for executing the IQ and IDCT in units of blocks according to control of the microprogram by the first control storage unit and the second control storage unit, each execution unit including a multiplier and an adder, and each execution unit takes charge of a partial block which is divided from the block.

By means of this structure, the plurality of execution units execute the calculation instructions in parallel, so that a large amount of routine calculations can be efficiently executed.

The calculation means of the media processing apparatus can be further made up of: a plurality of address translation tables which are set corresponding to the plurality of execution units, each address translation table storing translated addresses whose order is partially changed in a predetermined address sequence; an instruction register group including a plurality of registers which each store a microinstruction associated with one of the translated addresses, each microinstruction forming part of a microprogram that realizes a predetermined calculation; and a switching unit, which is set between the first and second control storage units and the plurality of execution units, for outputting microinstructions from the instruction registers to the plurality of execution units in place of a microinstruction outputted from one of the first control storage unit and the selector to every execution unit, and when the first read address or the second read address is an address of the predetermined address sequence, the address is translated into the translated addresses by the address translation tables, and the instruction register group outputs the microinstructions corresponding to the translated addresses outputted from the address translation tables.

With this structure, while the plurality of execution units perform the microprogram in parallel, the resource interference, such as an access contention, among the execution units can be avoided. As a result, the processing can be more efficiently performed.

When a microinstruction indicating one of an addition or subtraction operation is outputted from one of the instruction registers, each address translation table outputs a flag showing whether the microinstruction indicates an addition or a subtraction while the first program counter is outputting the first read address in the predetermined address sequence, the plurality of execution units perform addition or subtraction in accordance with the flag, and the flag is set in accordance with the microinstruction of the second control storage unit.

By means of this structure, a microinstruction is determined using the translation table whether it is an addition instruction or a subtraction instruction. This is to say, the microprogram can be shared in two ways. As a result, the whole capacity of the microprogram, the scale of hardware, and the cost can be reduced.

The second control storage unit can further output information showing a storage destination of a microinstruction execution result at a same time of an output of the microinstruction stored in the register while the first program counter outputs the first read address of the predetermined address sequence, and each execution unit can store the execution result in accordance with the storage destination information.

With this structure, the destination information can be designated independently of the microprogram of the instruction register set group, so that the microprogram can be shared by different processes, such as a partial process in the matrix calculation. As a result, the whole capacity of the microprogram, the scale of hardware, and the cost can be reduced.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 16 is a block diagram showing the structure of a media processing apparatus of the second embodiment of the present invention;

DESCRIPTION OF THE PREFERRED EMBODIMENT

The following is a description of a media processing apparatus of the present invention, with the description of the embodiments being divided into the following sections.
1. The First Embodiment
1.1 The Overall Structure of the Media Processing Apparatus
1.1.1 The Input/Output Processing Unit
1.1.2 The Decode Processing Unit
1.1.2.1 The Sequential Processing Unit
1.1.2.2 The Routine Processing Unit
1.2 The Structure of the Media Processing Apparatus
1.2.1 The Structure of the Input/Output Processing Unit
1.2.2 The Decode Processing Unit
1.2.2.1 The Sequential Processing Unit
1.2.2.2 The Routine Processing Unit
1.3 The Detailed Structure of the Components
1.3.1 The Processor (The Sequential Processing Unit)
1.3.2 The Routine Processing Unit
1.3.2.1 The Code Translation Unit
1.3.2.2 The Pixel Calculation Unit
1.3.2.3 The Pixel Read/Write Unit
1.3.3 The Input/Output Processing Unit
1.3.3.1 The I/O Processor
1.3.3.1.1 The Instruction Read Circuit
1.3.3.1.2 The Task Management Unit
1.4 Description of Operations
2. The Second Embodiment
2.1 The Structure of the Media Processing Apparatus
2.1.1 The Pixel Calculation Unit 1. The First Embodiment A media processing apparatus of the present embodiment is provided in a satellite broadcast tuner (called an STB (Set Top Box)), a DVD (Digital Versatile/Video Disc) reproduction device, a DVD-RAM record/reproduce device, and the like. The media processing apparatus inputs MPEG streams as compressed video and audio data from the satellite broadcast or the DVD, and performs an expand (referred to as "decode" hereafter) processing before outputting video signals and audio signals to external output devices.

1.1 The Overall Structure of the Media Processing Apparatus

Figure 1:
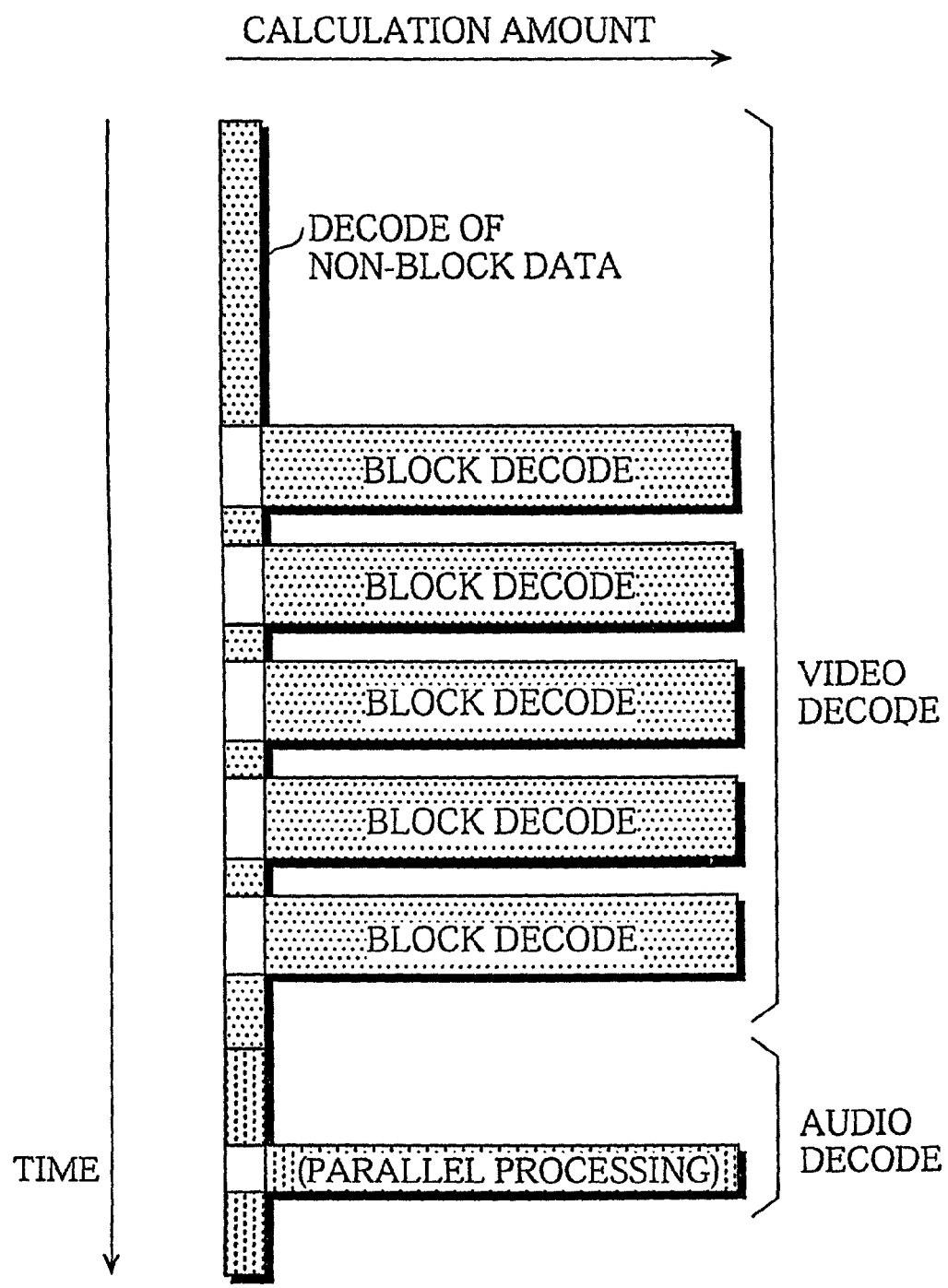
FIG. 1 shows a representation of the decode processing performed by the AV decoder of the first related art.
Figure 2:
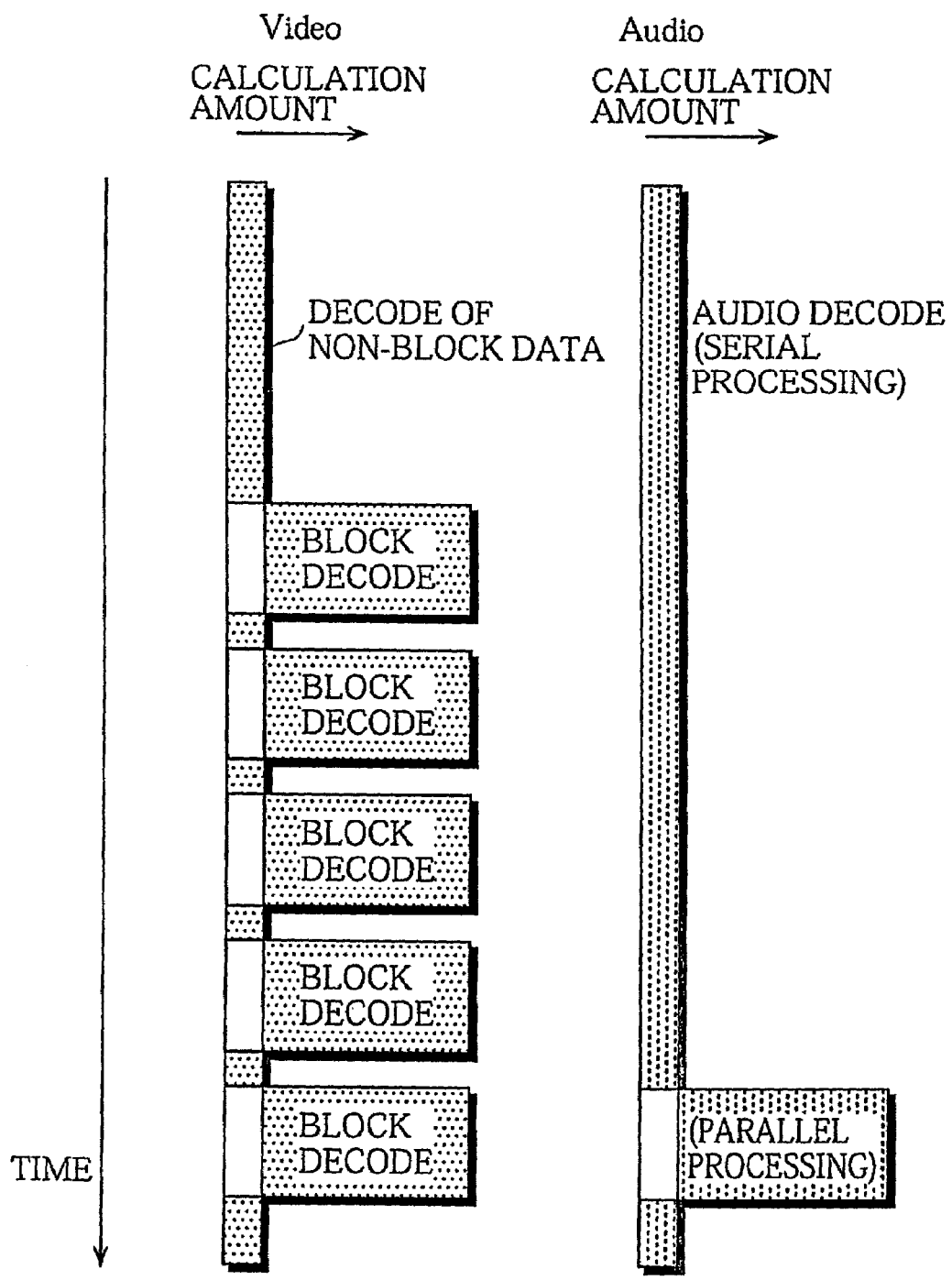
FIG. 2 shows a representation of the decode processing performed by the decoder with the two chip construction of the second related art.
Figure 3:
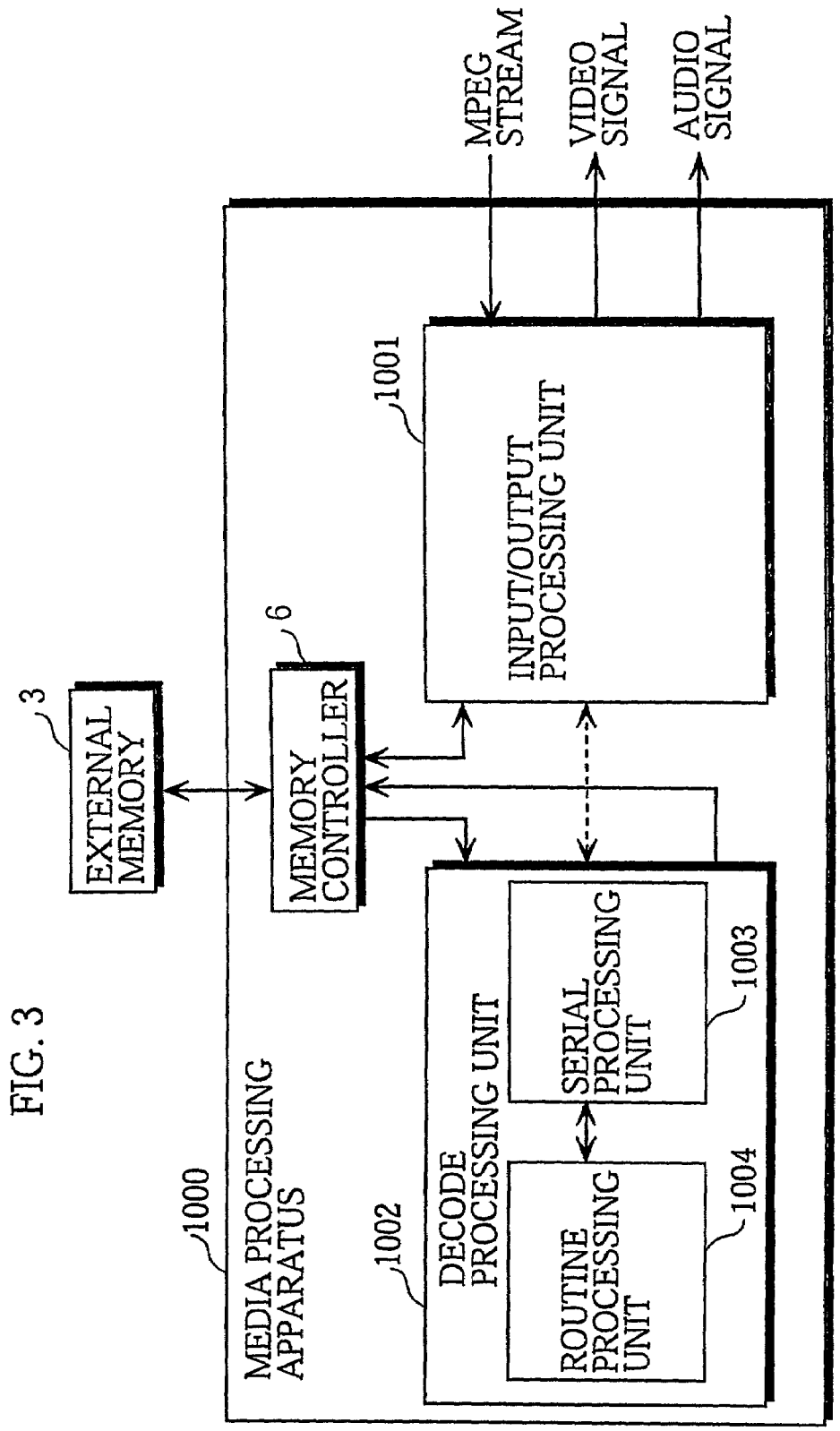
FIG. 3 is a block diagram showing the overall construction of a media processing apparatus of the first embodiment of the present invention.

FIG. 3 is a block diagram showing the overall structure of a media processing apparatus of the first embodiment of the present invention.

A media processing apparatus 1000 is composed of an input/output processing unit 1001, a decode processing unit 1002, and a memory controller 6. The media processing apparatus 1000 performs input/output processing and decode processing separately and in parallel. An external memory 3 is used as a work memory for temporarily storing an MPEG stream and decoded audio data, and as a frame memory for storing decoded video data.

1.1.1 The Input/Output Processing Unit

The input/output processing unit 1001 performs input/output processing which does not occur in synchronization with the operation of the media processing apparatus 1000. The input/output processing includes: (a) inputting an MPEG stream which is asynchronously and externally inputted and temporarily storing the MPEG stream in the external memory 3; (b) supplying the MPEG stream stored in the external memory 3 to the decode processing unit 1002; and (c) reading the decoded video and audio data from the external memory 3 and respectively outputting the decoded video data and the decoded audio data to an external display device (not illustrated) and an external audio output device (not illustrated) in accordance with respective output rates of these devices.

1.1.2 The Decode Processing Unit

The decode processing unit 1002 decodes the MPEG stream supplied by the input/output processing unit 1001 and stores the decoded video and decoded audio data into the external memory 3. This operation of the decode processing unit 1002 is performed independently of and in parallel with the operation of the input/output processing unit 1001. Since the decode processing of the MPEG stream requires a large amount of calculations and the content of the processing varies, the decode processing unit 1002 is composed of a sequential processing unit 1003 and a routine processing unit 1004. Using the sequential processing unit 1003 and the routine processing unit 1004, the decode processing unit 1002 performs sequential processing which is mainly for judging various conditions as well as performing routine processing which is mainly for the large amount of routine calculation and is suited to parallel calculations. The sequential processing and the routine processing are executed separately and in parallel. The sequential processing is for header analysis of MPEG streams, the header analysis including header detection and various condition judgements, such as judgement of the header content. Meanwhile, the routine processing is for various calculations which are to be performed in units of blocks. Here, each block is composed of a predetermined number of pixels. As such, the routine processing is suitable for parallel processing as in a pipeline structure and also suitable for parallel processing as in a vector calculation where the same calculation is performed on different data (i.e., different pixels).

1.1.2.1 The Sequential Processing Unit

The sequential processing unit 1003 performs the following operations as the sequential processing: analyzing headers of the compressed audio data and the compressed video data supplied by the input/output processing unit 1001; controlling the activation of the routine processing unit 1004 for each macroblock; and performing the decode processing on the compressed audio data. The header analysis includes the analysis of a macroblock header of the MPEG stream and the decoding of motion vectors. Here, a block represents an image composed of 8 by 8 pixels, and a macroblock is composed of four luminance blocks and two chrominance blocks. The motion vector referred to here specifies a rectangle area composed of 8 by 8 pixels in the reference frame. In other words, the motion vector shows the rectangle area, and difference is measured between the present block and this rectangle area.

1.1.2.2 The Routine Processing Unit

Receiving an instruction from the sequential processing unit 1003 to decode for each macroblock, the routine processing unit 1004 performs the decode processing on macroblocks as the routine processing in parallel with the audio decode processing performed by the sequential processing unit 1003. In this decode processing, the routine processing unit 1004 performs Variable Length Code Decoding (VLD), Inverse Quantization (IQ), Inverse Discrete Cosine Transform (IDCT), and Motion Compensation (MC) in this order. When performing the MC, the routine processing unit 1004 stores the decoded block in the external memory 3 serving as the frame memory via the memory controller 6.

1.2 The Structure of the Media Processing Apparatus

Figure 4:
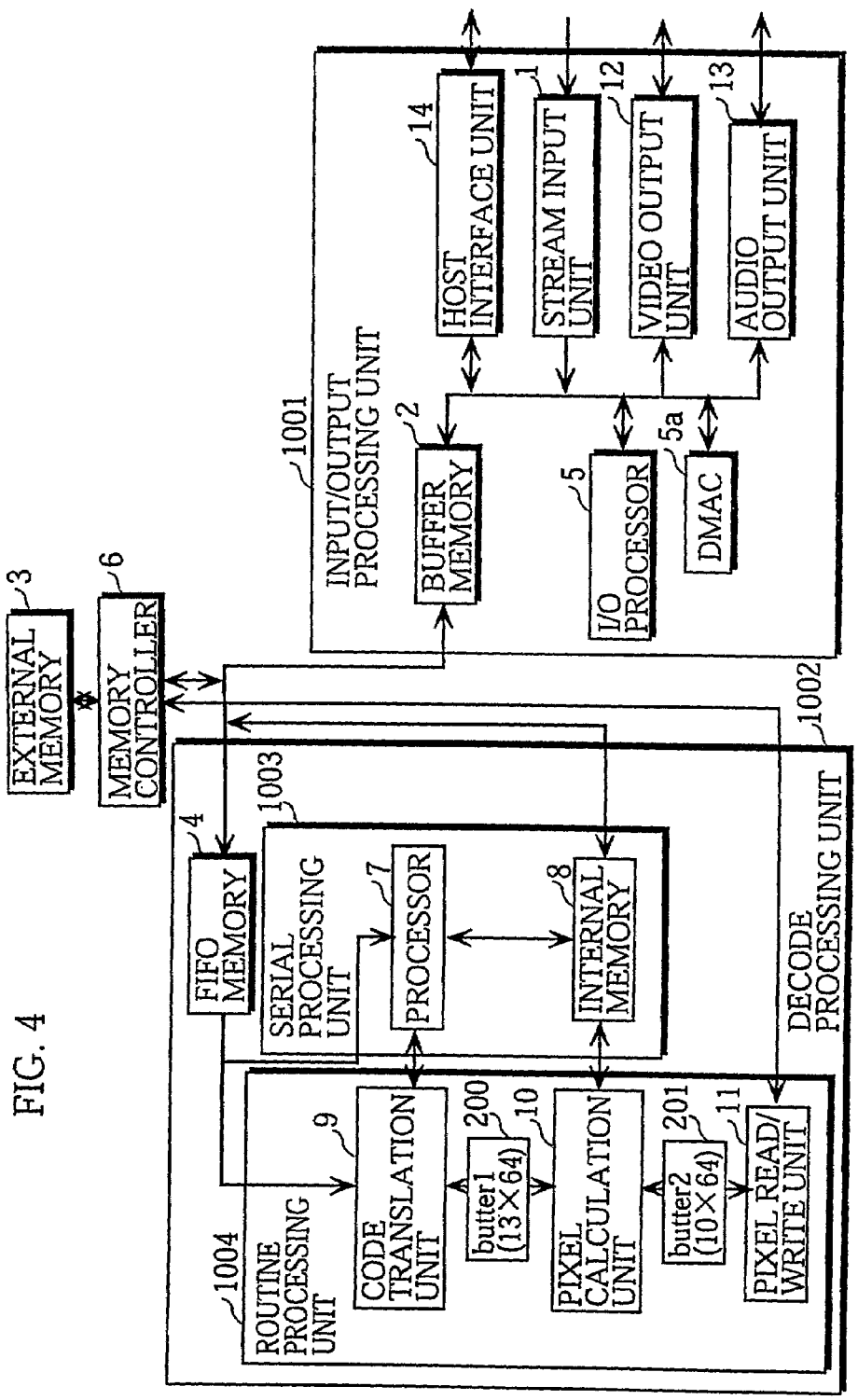
FIG. 4 is a block diagram showing the structure of a media processing apparatus of the first embodiment of the present invention.

FIG. 4 is a block diagram showing the detailed structure of the media processing apparatus 1000.

1.2.1 The Structure of the Input/Output Processing Unit

As shown in FIG. 4, the input/output processing unit 1001 is composed of a stream input unit 1, a buffer memory 2, an input/output processor 5 (the "I/O processor 5", hereafter), a DMAC (Direct Memory Access Controller) 5a, a video output unit 12, an audio output unit 13, and a host interface unit 14.

The stream input unit 1 converts MPEG data streams sequentially inputted from outside into parallel data (referred to as "MPEG data" hereafter). In doing so, the stream input unit 1 detects a start code of a GOP (Group of Picture) from an MPEG data stream, and informs the I/O processor 5. The GOP referred to here includes one I-picture (short for "Intra-picture") and is an MPEG data stream equivalent to video data of about 0.5 seconds. When informed by the stream input unit 1 that a GOP has been detected, the I/O processor 5 has the converted MPEG data transferred to the buffer memory 2.

The buffer memory 2 temporarily stores the MPEG data transmitted from the stream input unit 1. The MPEG data stored in the buffer memory 2 is then transferred to the external memory 3 via the memory controller 6 according to control by the I/O processor 5.

The external memory 3, which is composed of an SDRAM (Synchronous Dynamic Random Access Memory) chip, temporarily stores the MPEG data transmitted from the buffer memory 2 via memory controller 6. In addition, the external memory 3 stores the decoded video data (also referred to as the "frame data" hereafter) and the decoded audio data.

The I/O processor 5 controls data inputs/outputs between the stream input unit 1, the buffer memory 2, the external memory 3 (linked via the memory controller 6), and a FIFO memory 4. In detail, the data transfers (DMA transfers) using the following paths described as (1) to (4) are controlled:

(1) the stream input unit 1→the buffer memory 2→memory controller 6→the external memory 3;

(2) the external memory 3→the memory controller 6→the FIFO memory 4;

(3) the external memory 3→the memory controller 6→the buffer memory 2→the video output unit 12; and (4) the external memory 3→the memory controller 6→the buffer memory 2→the audio output unit 13.

In these paths, the I/O processor 5 separately controls the transfers of video data and audio data included in the MPEG data. The paths(1) and (2) are used for the transfer of the MPEG data which has not been decoded yet. The I/O processor 5 separately transfers the compressed video data and the compressed audio data on the paths(1) and (2). The path(3) is used for the decoded video data, and the path(4) for the decoded audio data. Here, the decoded video data and the decoded audio data are respectively transferred to the external display device (not illustrated) and the external output device (not illustrated) in accordance with the respective output rates.

The DMAC 5a executes the following transfers in accordance with control by the I/O processor 5: the DMA transfer between the buffer memory 2 and each of the stream input unit 1, the video output unit 12, and the audio output unit 13; the DMA transfer between the buffer memory 2 and the external memory 3; and the DMA transfer between the external memory 3 and the FIFO memory 4.

The video output unit 12 requests the I/O processor 5 to output the data in accordance with the output rate (a cycle of the horizontal synchronization signal Hsync, for example) of the external display device (such as a CRT (Cathode-Ray Tube)), and then outputs the video data inputted by the I/O processor 5 through the path(3) to the display device.

The audio output unit 13 requests the I/O processor 5 to output the data in accordance with the output rate of the external audio output device, and then outputs the audio data inputted by the I/O processor 5 through the path(4) to the audio output device (such as a D/A (digital-to-analog) converter, an audio amplifier, and a pair of speakers).

The host interface unit 14 is an interface used for communication with an external host processor, such as a processor which performs the overall control in the case where the media processing apparatus is provided in a DVD reproduction device. In this communication, the host processor sends instructions, such as decoding start, stop, fast-forward search, and reverse reproduction, for decoding the MPEG streams.

1.2.2 The Decode Processing Unit

The decode processing unit 1002 shown in FIG. 4 is composed of the FIFO memory 4, the sequential processing unit 1003, and the routine processing unit 1004. The decode processing unit 1002 performs the decode processing on the MPEG data supplied by the input/output processing unit 1001 via the FIFO memory 4. The sequential processing unit 1003 is composed of a processor 7 and an internal memory 8. The routine processing unit 1004 is composed of a code translation unit 9, a pixel calculation unit 10, a pixel read/write unit 11, a buffer 200, and a buffer 201.

The FIFO memory 4 is composed of two FIFOs (referred to as the "video FIFO" and the "audio FIFO" hereafter), and stores the compressed video data and the compressed audio data transferred from the external memory 3 according to control by the I/O processor 5 using the FIFO (first-in first-out) method.

1.2.2.1 The Sequential Processing Unit

The processor 7 controls reading of the compressed video data and the compressed audio data stored in the FIFO memory 4, and also performs the decode processing on a part of the compressed video data and the all compressed audio data. The decode processing on a part of the compressed video data includes analysis of header information in the MPEG data, calculation of motion vectors, and control of the decode processing of the compressed video data. Here, the decode processing on the all compressed video data is shared by the processor 7 and the routine processing unit 1004. More specifically, the processor 7 takes charge of the sequential processing which requires various condition judgements, while the routine processing unit 1004 takes charge of the processing of the huge amount of routine calculation. At the same time, the processor 7 is also assigned the charge of the decode processing of the all audio data since the amount of calculations for the audio decoding is small compared to the amount required by the video decoding.

Figure 5:
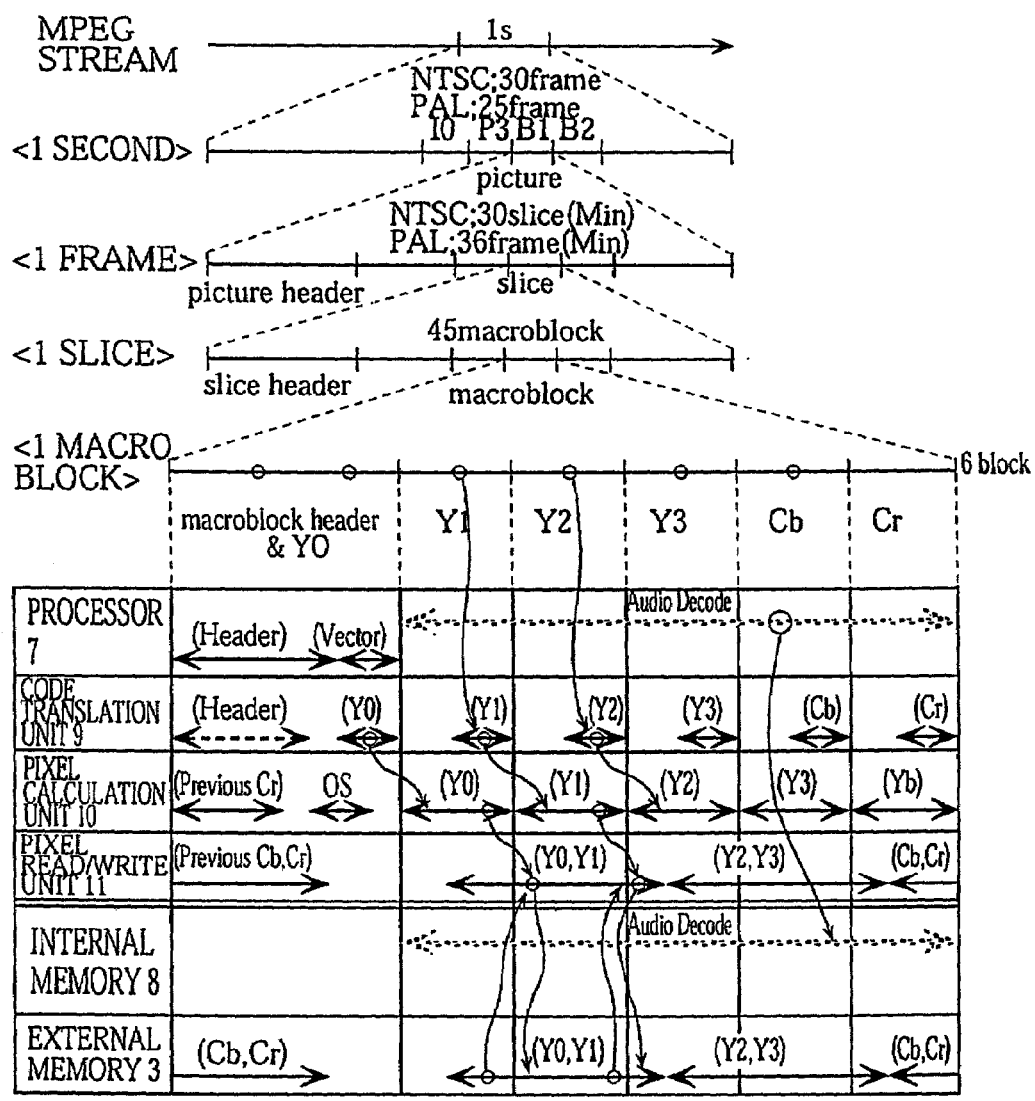
FIG. 5 is a timing chart showing the hierarchical structure of an MPEG stream and the operation timing of each unit provided in the media processing apparatus.

The functions of the processor 7 are described in detail below, with reference to FIG. 5. FIG. 5 is a timing chart showing the hierarchical structure of an MPEG stream and the operation timing of each unit provided in the present media processing apparatus. In FIG. 5, the horizontal axis denotes time. In this hierarchy, the MPEG stream is on the highest level, with one second of the MPEG stream including a plurality of frames (I-picture, P-picture (short for "Predicative-picture"), and B-picture (short for "Bidirectionally Predicative-picture") being shown as the second level. One frame is shown as the third level, with a picture header and a plurality of slices being included. One slice is shown as the fourth level, with a slice header and a plurality of macroblocks being included. Finally, one macroblock is shown as the fifth level, with a macroblock header and six blocks being included.

The data structure of the MPEG stream composed of the levels from the first level to the fifth level shown in FIG. 5 is explained in a number of publications, such as the Japanese publication "*Pointo Zukaishiki Saishin MPEG Kyoukasho* (Latest MPEG techniques—An Illustrated Reader)" by ASCII Publishing Inc.

As shown from the fifth level down in FIG. 5, the processor 7 performs the header analysis and the decode processing of the compressed audio data down to the macroblock level of the MPEG stream. In doing so, the processor 7 instructs the code translation unit 9, the pixel calculation unit 10, and the pixel read/write unit 11 to start the decode processing of macroblocks in accordance with a result of the header analysis for each macroblock. While the decode processing is being performed by the code translation unit 9, the pixel calculation unit 10, and the pixel read/write unit 11, the processor 7 reads the compressed audio data from the FIFO memory 4 and performs the audio decode processing. When receiving notification via an interrupt signal that the decode processing of the macroblock has been completed by the code translation unit 9, the pixel calculation unit 10, and the pixel read/write unit 11, the processor 7 suspends the decode processing of the compressed audio data and starts the header analysis of a next macroblock.

The internal memory 8, which serves as a work memory of the processor 7, temporarily stores the decoded audio data. This audio data stored in the internal memory 8 is transferred to the external memory 3 through the path(4) according to control by the I/O processor 5.

1.2.2.2 The Routine Processing Unit

The code translation unit 9 performs the VLD on the compressed video data read from the FIFO memory 4. As shown in FIG. 5, the code translation unit 9 transfers the information relating to header information and motion vectors (the section shown by the broken line in FIG. 5) out of the decoded video data, and also transfers the data of a macroblock (the sections shown by the solid lines in FIG. 5) to the pixel calculation unit 10 via the buffer 200. Here, the macroblock is composed of six blocks, that is, luminance blocks Y0 to Y3 and chrominance blocks Cb and Cr. The macroblock data decoded by the code translation unit 9 represents spatial frequency component data.

The buffer 200 stores the spatial frequency component data of one block (8 by 8 pixels) written by the code translation unit 9.

The pixel calculation unit 10 performs the IQ and IDCT on the block data transferred from the code translation unit 9 via buffer 200 in units of blocks. The processing result given by the pixel calculation unit 10, i.e., data representing pixel luminance values or differences in the case of a luminance block and data representing pixel chrominance values or differences in the case of a chrominance block, is transferred to the pixel read/write unit 11 via the buffer 201. The buffer 201 stores pixel data of one block 8 by 8 pixels).

The pixel read/write unit 11 performs the MC on the processing result given by the pixel calculation unit 10 in units of blocks. More specifically, for P-pictures or B-pictures, the pixel read/write unit 11 extracts a rectangle area indicated by the motion vector from the decoded reference frame in the external memory 3 via the memory controller 6 and blends the rectangle area with the block processed by the pixel calculation unit 10 to obtain an original block image. The decode result given by the pixel read/write unit 11 here is stored in the external memory 3 via the memory controller 6.

The MC, IQ, and IDCT are well known, so that no detailed explanation will be given (see the above-mentioned Japanese publication).

1.3 The Detailed Structure of the Components

The following is a detailed description of main units provided in the media processing apparatus 1000.

1.3.1 The Processor (The Sequential Processing Unit)

Figure 6:
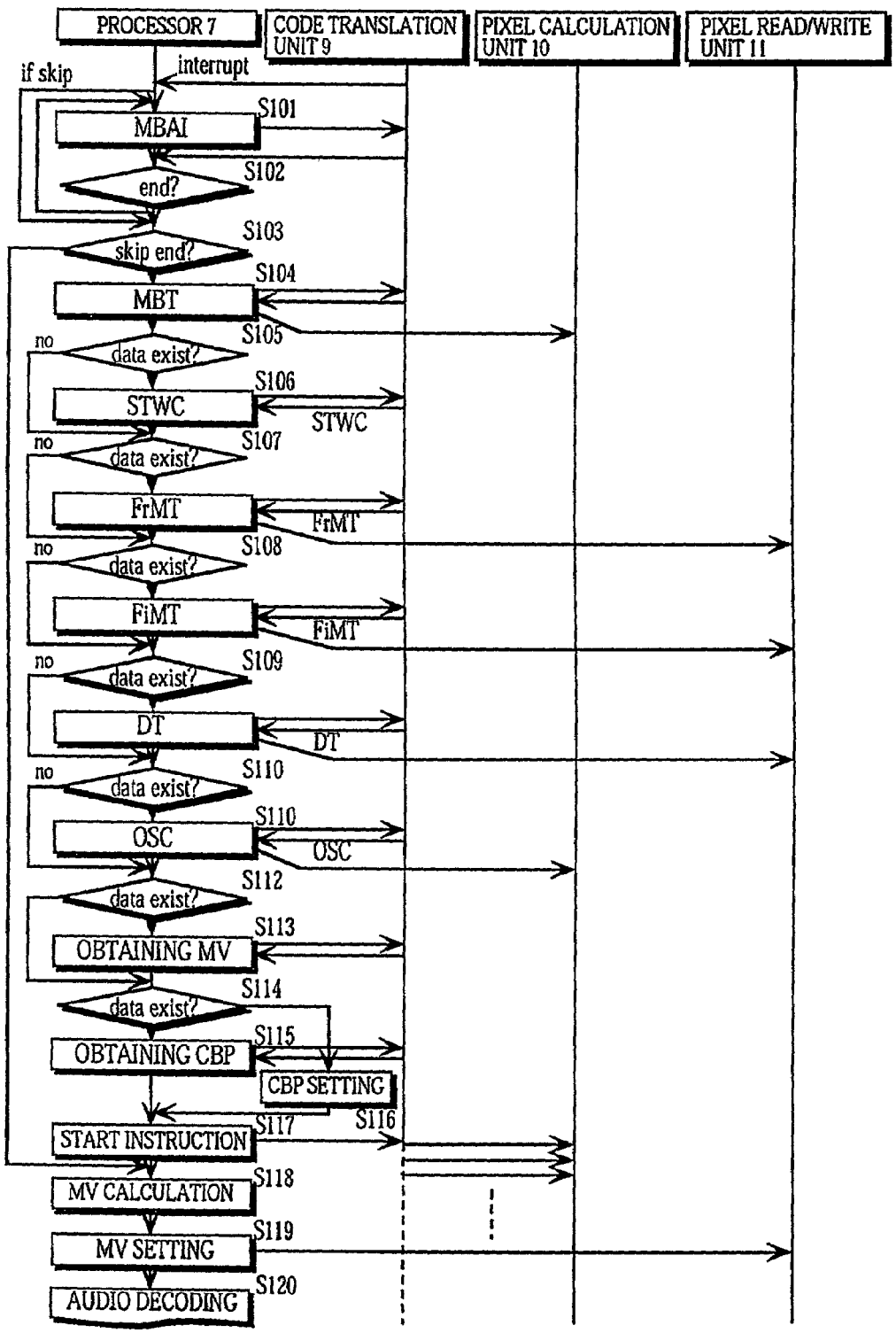
FIG. 6 shows an analysis of a macroblock header and control flow of each unit performed by a processor.

FIG. 6 shows an analysis of a macroblock header and control flow of each unit performed by the processor 7. Each set of data in the macroblock header shown in FIG. 6 using abbreviations is explained in the above-mentioned publication, and will therefore, not be explained here.

As shown in FIG. 6, the processor 7 issues commands to the code translation unit 9 and sequentially obtains data of a header part on which the VLD has been performed. In accordance with the contents of the obtained data, the processor 7 sets the necessary data for the decode processing of the macroblock in the code translation unit 9, the pixel calculation unit 10, and the pixel read/write unit 11.

More specifically, the processor 7 issues a command to the code translation unit 9 to obtain an MBAI (macroblock Address Increment) (step S101). In accordance with this MBAI, the processor 7 judges whether the present macroblock is a skipped macroblock (that is, the present macroblock which is to be decoded is the same as a rectangle area in the reference frame). If it is, this means that the macroblock data is omitted so that the processing proceeds to step S118, and, if not, the processor 7 continues the header analysis (steps S102 and S103).

Next, the processor 7 issues a command to the code translation unit 9 to obtain an MBT (macroblock Type). In accordance with this MBT, the processor 7 judges whether the scan type of the present block is zigzag scan type or alternate scan type, and then indicates the read order of data stored in the buffer 200 to the pixel calculation unit 10 (step S104).

Also, the processor 7 judges whether an STWC (Spatial Temporal Weight Code) exists in the obtained header data (step S105). If so, the processor 7 issues a command to obtain it (step S106).

In the same way, the processor 7 obtains FrMT (Frame Motion Type), FiMT (Field Motion Type), DT (DCT Type), QSC (Quantizer Scale Code), MV (Motion Vector), and CBP (Coded Block Pattern) (steps S107 to S116). When doing so, the processor 7 informs the pixel read/write unit 11 of the analysis results of the FrMT, FiMT, and DT, informs the pixel calculation unit 10 of the analysis result of the QSC, and informs the code translation unit 9 of the analysis result of the CBP. Accordingly, the information required for the IQ, IDCT, and MC is separately set in the code translation unit 9, the pixel calculation unit 10, and the pixel read/write unit 11.

The processor 7 next issues a command to the code translation unit 9 to start the decode processing of the macroblock (step S117). Following this command, the code translation unit 9 starts the VLD for each block of the macroblock, and then outputs the VLD result to the pixel calculation unit 10 via the buffer 200. The processor 7 calculates the motion vectors in accordance with the MV data (step S118), and informs the pixel read/write unit 11 of the calculation result (step S119).

In the above processing regarding the motion vectors, it is necessary to perform a series of processes including obtaining the MV data (step S113), calculating the motion vector (step S118), and setting the motion vectors in the pixel read/write unit 11 (step S119). Here, the processor 7 does not calculate or set the motion vectors (steps S118 and S119) immediately after obtaining the MV data (step S113), but instead first issues a command for the routine processing unit 1004 to start decoding before calculating and setting the motion vector. In this way, the processing for calculating and setting of the motion vector by the processor 7 and the decode processing by the routine processing unit 1004 are performed in parallel. In other words, the start of the decode processing by the routine processing unit 1004 is brought forward.

Accordingly, the header analysis of the compressed video data of one macroblock is completed. Then, the processor 7 obtains the compressed audio data from the FIFO memory 4 and starts the audio decode processing (step S120). This audio decode processing will be continued until an interrupt signal indicating the completion of the decode processing of the macroblock is inputted from the code translation unit 9. When receiving the interrupt signal, the processor 7 starts the header analysis of a next macroblock.

1.3.2 The Routine Processing Unit

The routine processing unit 1004 performs the decode processing on six blocks of the macroblock, having the code translation unit 9, the pixel calculation unit 10, and the pixel read/write unit 11 operate in parallel (as in pipeline processing). The following is a detailed description of the structures of the code translation unit 9, the pixel calculation unit 10, and the pixel read/write unit 11.

1.3.2.1 The Code Translation Unit

Figure 19:
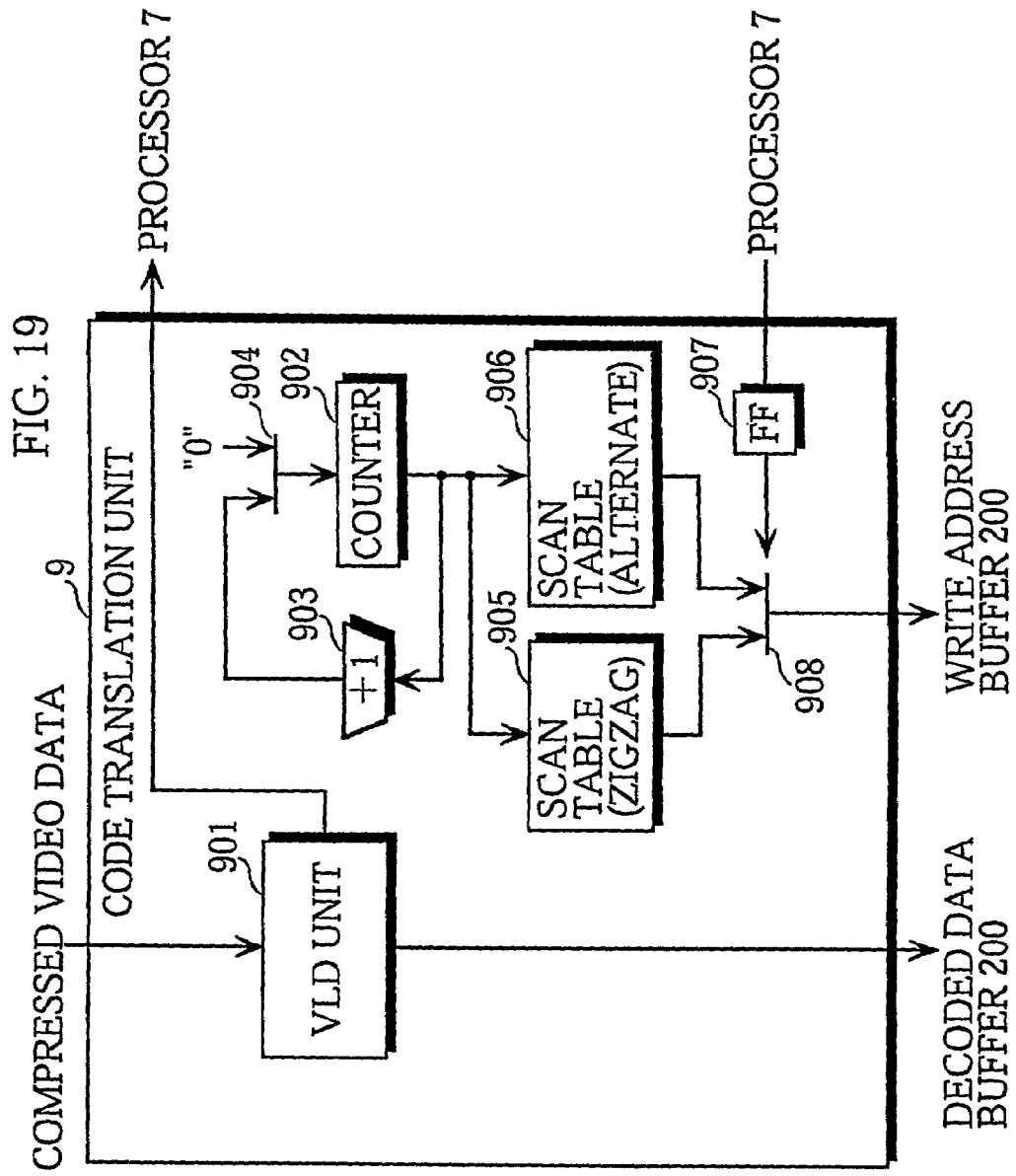
FIG. 19 is a block diagram showing the structure of a code translation unit.

FIG. 19 is a block diagram showing the structure of the code translation unit 9.

The code translation unit 9 shown in FIG. 19 is composed of a VLD unit 901, a counter 902, an incrementor 903, a selector 904, a scan table 905, a scan table 906, a flip-flop (hereafter, "FF"), and a selector 908. The code translation unit 9 writes the VLD result into the buffer 200 in units of blocks to arrange the blocks in the order determined by the zigzag scan or the alternate scan.

The VLD unit 901 performs the VLD on the compressed video data read from the FIFO memory 4 and transfers information concerning the header information and the motion vectors (a section shown by the broken line in FIG. 5) out of the decoded video data to the processor 7. Also, the code translation unit 9 outputs data of a macroblock (section shown by the full line in FIG. 5) to the buffer 200 in units of blocks (i.e., in units of 64 sets of spatial frequency data).

A loop circuit composed of the counter 902, the incrementor 903, and the selector 904 repeatedly counts the numbers from 0 to 63 in synchronization with the output of the spatial frequency data from the VLD unit 901.

Figure 20:
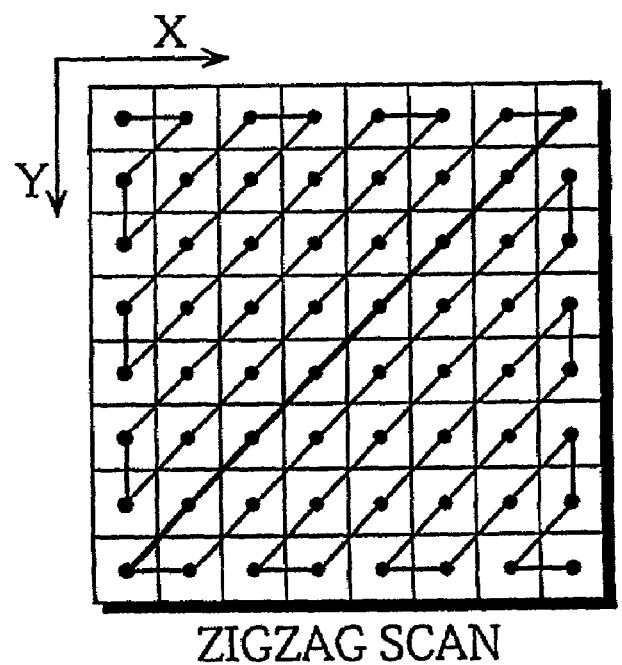
FIG. 20 shows a block storage area storing spatial frequency data of 8 by 8 pixels and also shows a zigzag scan route.

The scan table 905 is a table storing the addresses of the block storage area of the buffer 200 in the order of the zigzag scan. The output values of the counter 902 (values from 0 to 63) are inputted to the scan table 905 in order, and then the scan table 905 sequentially outputs the addresses. FIG. 20 shows the block storage area storing spatial frequency data of 8 by 8 pixels in the buffer 200 and also shows a zigzag scan route. The scan table 905 sequentially outputs the pixel addresses in the order according to the route shown in FIG. 20.

Figure 21:
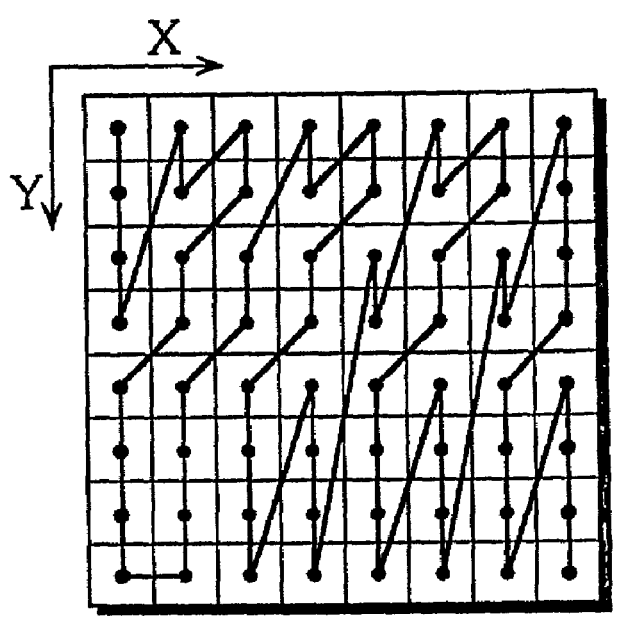
FIG. 21 shows a block storage area storing spatial frequency data of 8 by 8 pixels and also shows an alternate scan route.

The scan table 906 is a table storing the addresses of the block storage area of the buffer 200 in the order of the alternate scan. The output value of the counter 902 (values from 0 to 63) is inputted to the scan table 906 in order, and then the scan table 906 sequentially outputs the addresses. FIG. 21 shows a block storage area storing spatial frequency data of 8 by 8 pixels in the buffer 200 and also shows an alternate scan route. The scan table 906 sequentially outputs the pixel addresses in the order according to the route shown in FIG. 21.

The FF 907 holds a flag indicating the scan type (the zigzag scan or the alternate scan). This flag is set by the processor 7.

The selector 908 selects the address outputted from the scan table 905 or the scan table 906 in accordance with the flag held by the FF 907, and outputs the address as a write address to the buffer 200.

1.3.2.2 The Pixel Calculation Unit

Figure 7:
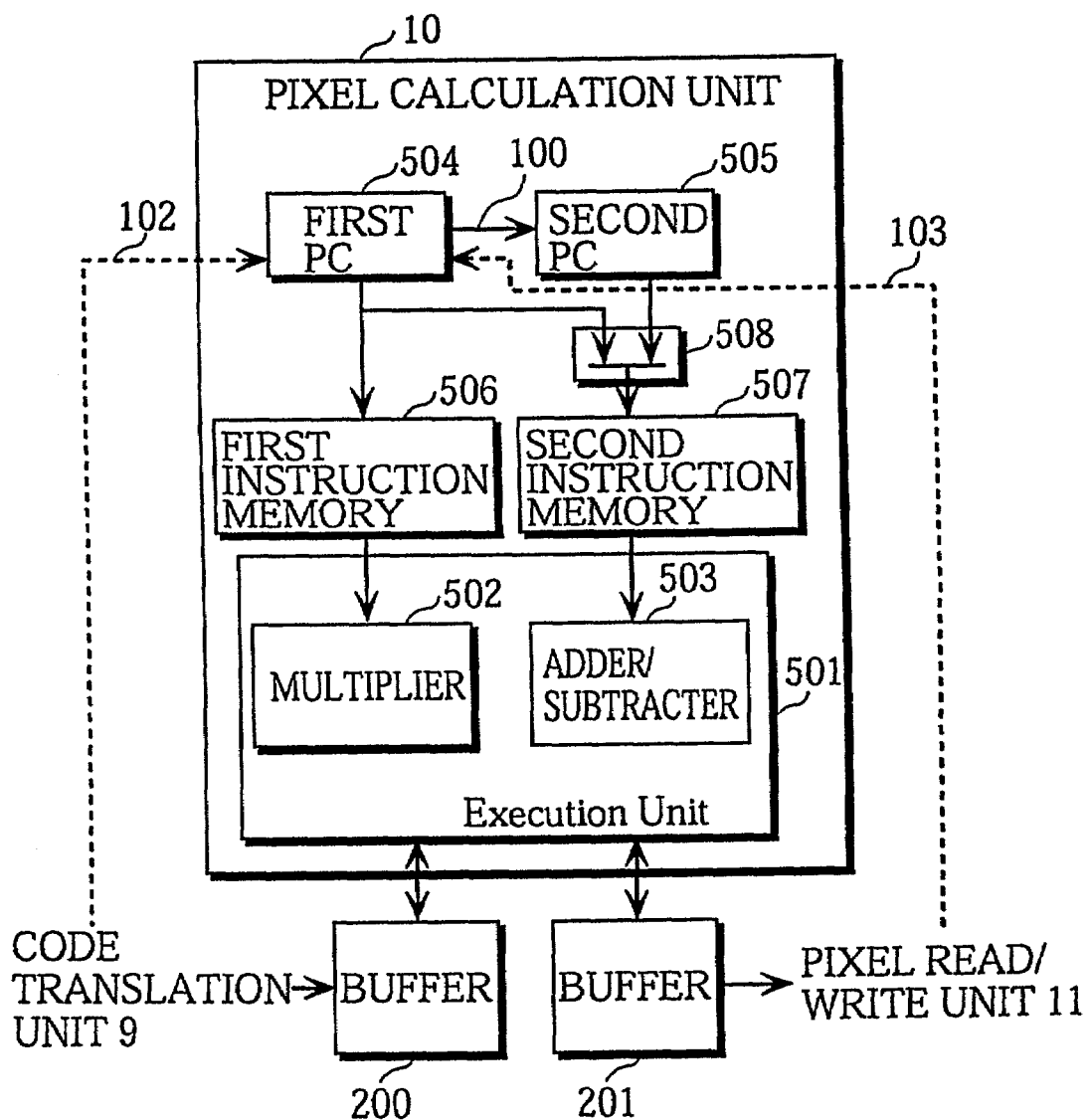
FIG. 7 is a block diagram showing the structure of a pixel calculation unit.

FIG. 7 is a block diagram showing the structure of the pixel calculation unit 10.

As shown in FIG. 7, the pixel calculation unit 10 is composed of an execution unit 501 including a multiplier 502 and an adder-subtracter 503, a first program counter (the "first PC", hereafter) 504, a second program counter (the "second PC", hereafter) 505, a first instruction memory 506, a second instruction memory 507, and a selector 508. The pixel calculation unit 10 can execute the IQ and the IDCT in parallel, having the IQ and part of the IDCT overlapped.

In accordance with microinstructions sequentially outputted from the first instruction memory 506 and the second instruction memory 507, the execution unit 501 executes calculations and accesses to the buffer 200 and the buffer 201.

Figure 8:
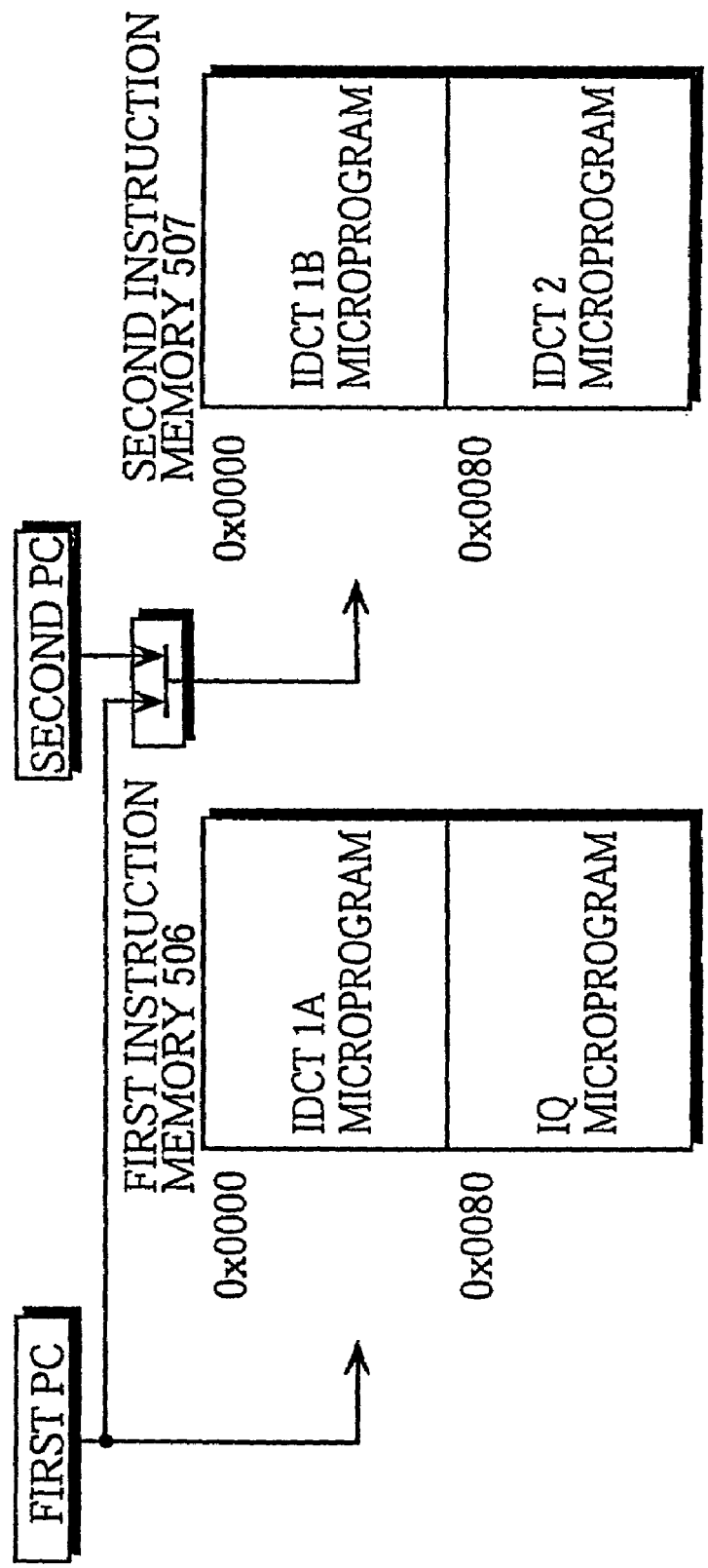
FIG. 8 shows an example of the microprograms stored in a first instruction memory and a second instruction memory.

The first instruction memory 506 and the second instruction memory 507 are control memories which respectively store a microprogram for performing the IQ and IDCT on the blocks (the frequency components) stored in the buffer 200. FIG. 8 shows an example of the microprogram stored in the first instruction memory 506 and the second instruction memory 507.

As shown in FIG. 8, the first instruction memory 506 stores an IDCT 1A microprogram and an IQ microprogram, with a read address being designated by the first PC 504. The IQ program is for executions of data reading from the buffer 200 and calculation processing mainly for the multiplications, with the adder-subtracter 503 not being used.

The second instruction memory 507 stores an IDCT 1B microprogram and an IDCT 2 microprogram, with a read address being designated by the first PC 504 or the second PC 505 via the selector 508. Here, the IDCT 1 means the first half of the IDCT processing. In this first half, which is mainly composed of multiplications, additions, and subtractions, processing is performed using the whole execution unit 501, by having the IDCT 1A microprogram and the IDCT 1B microprogram simultaneously read out. Meanwhile, the IDCT 2 means the second half of the IDCT processing, which is mainly composed of additions and subtractions, and the write processing for the buffer 201. The IDCT 2 is executed using the adder-subtracter 503, with the IDCT 2 microprogram stored in the second instruction memory 507 being read out.

Figure 9:
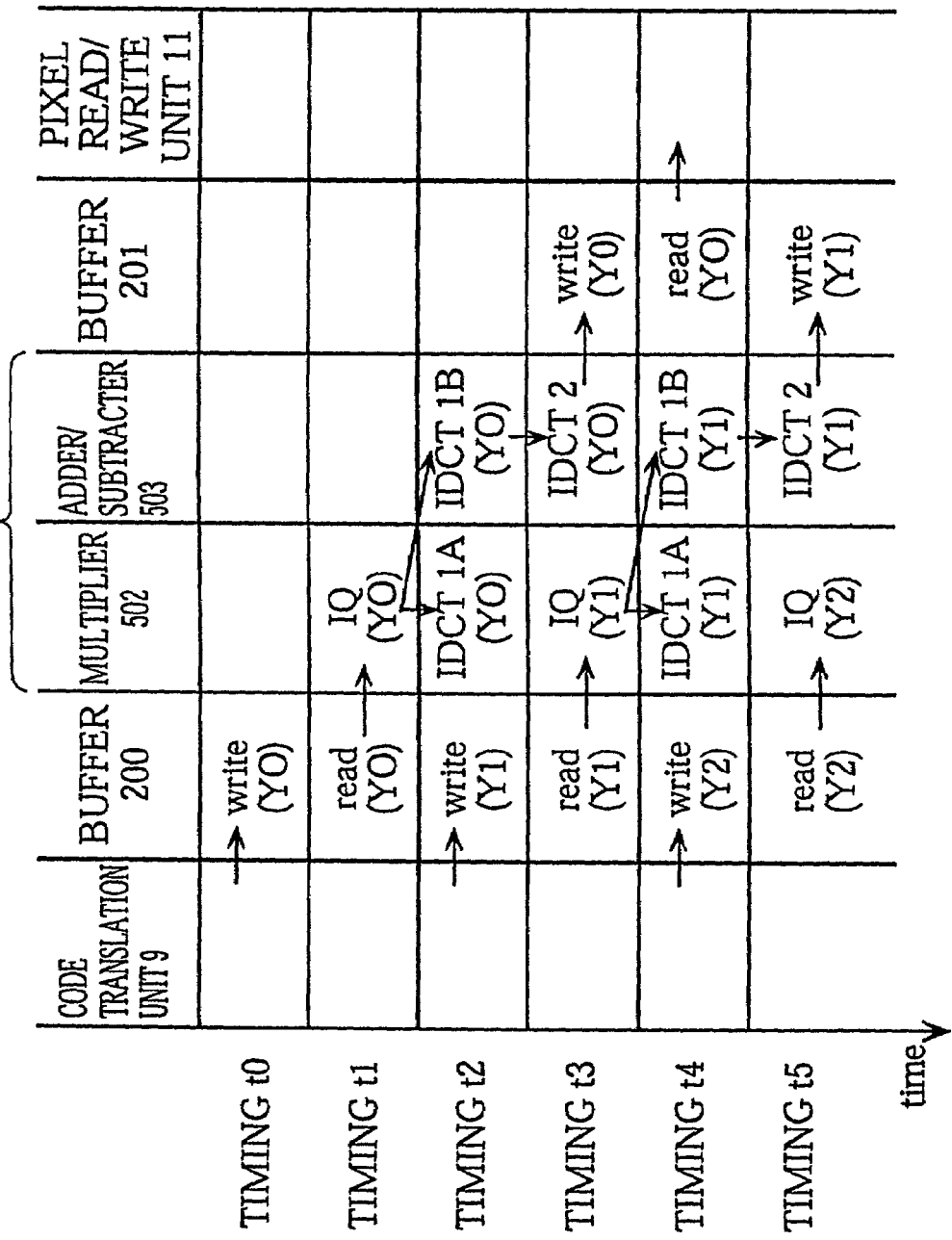
FIG. 9 is a timing chart showing the operation timing of the pixel calculation unit.

The IQ is performed by the multiplier 502 and the IDCT 2 is by the adder-subtracter 503. Therefore, the IQ and IDCT 2 can be performed in parallel. FIG. 9 is a timing chart showing the operation timing of the IQ, IDCT 1, and IDCT 2 performed by the pixel calculation unit 10.

As shown in FIG. 9, the code translation unit 9 writes the data of the luminance block Y0 into the buffer 200 (Timing t0), and informs the pixel calculation unit 10 via a control signal 102. The pixel calculation unit 10 then performs the IQ on the data stored in the buffer 200 by executing the IQ microprogram of the first instruction memory 506 in accordance with the address designated by the first PC 504, using a QS (Quantizer Scale) value set during the header analysis by the processor 7. Here, the selector 508 selects the first PC 504 (Timing t1).

Next, the pixel calculation unit 10 performs the IDCT 1 on the data stored in the buffer 200 by executing the IDCT 1A and IDCT 1B microprograms in accordance with the address designated by the first PC 504. Here, the selector 508 selects the first PC 504, so that the address is designated to both the first instruction memory 506 and the second instruction memory 507 (Timing t2).

Then, the pixel calculation unit 10 uses the QS value to perform the IQ on the data of the luminance block Y1 stored in the buffer 200 by executing the IQ microprogram of the first instruction memory 506 in accordance with the address designated by the first PC 504. Simultaneously, the pixel calculation unit 10 performs the second half of the IDCT processing on the luminance block Y0 by executing the IDCT 2 microprogram of the second instruction memory 507 in accordance with the address designated by the second PC 505. Here, the selector 508 selects the second PC 505, meaning that the first PC 504 and the second PC 505 separately designate addresses (Timing t3).

In the same way, the pixel calculation unit 10 continues the processing in units of blocks (Timing t4 onwards).

1.3.2.3 The Pixel Read/Write Unit

Figure 10:
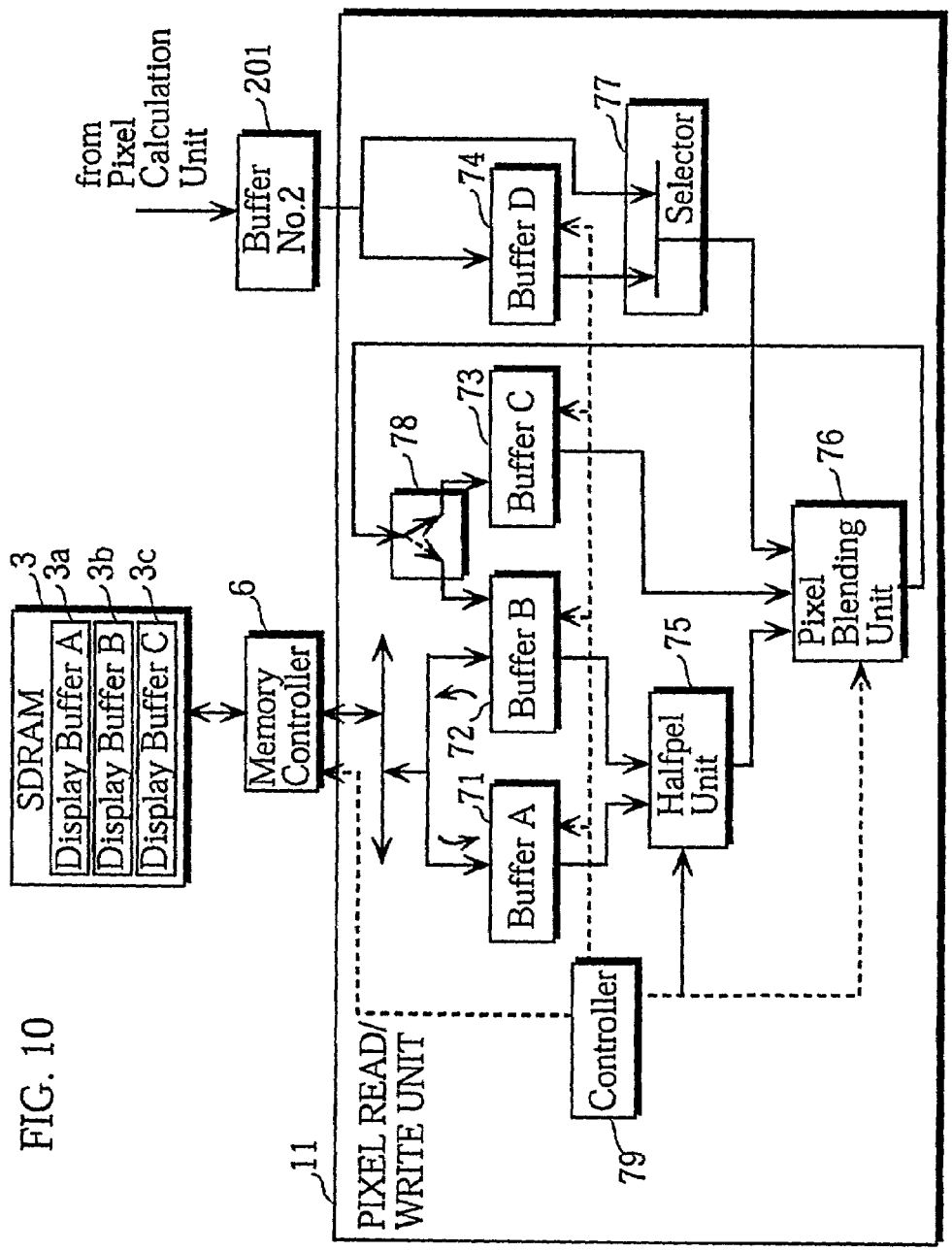
FIG. 10 is a block diagram showing the detailed structure of a pixel read/write unit.

FIG. 10 is a block diagram showing the detailed structure of the pixel read/write unit 11.

As shown in FIG. 10, the pixel read/write unit 11 is composed of buffers 71 to 74 (referred to as the "buffers A to D" hereafter), a half-pixel (the "halfpel", hereafter) interpolation unit 75, a blending unit 76, selectors 77 and 78, and a read/write control unit 79.

The read/write control unit 79 performs the MC on the block data inputted via the buffer 201 using the buffers A to D, and transfers the decoded images to the external memory 3 in units of two blocks. More specifically, the read/write control unit 79 controls the memory controller 6 to read out rectangle areas corresponding to the present two blocks from the reference frame stored in the external memory 3 in accordance with the motion vectors set during the header analysis by the processor 7. As a result, the data of the rectangle areas corresponding to the two blocks indicated by the motion vectors are stored in the buffer A or the buffer B. Following this, the blending unit 76 performs the halfpel interpolation on the rectangle areas of the two blocks, depending on the picture type (whether the I-pictures, the P-pictures, or the B-pictures). The read/write control unit 79 calculates pixel values of the present two blocks by blending the block data inputted via buffer 201 with the halfpel interpolated rectangle areas (by adding the block data to the rectangle area), and then stores the calculated pixel values in the buffer B. These decoded blocks stored in the buffer B are transferred to the external memory 3 via the memory controller 6.

1.3.3 The Input/Output Processing Unit

The input/output processing unit 1001 is structured to switch a plurality of tasks which share various data transfers, without generating overheads, so as to execute many data inputs/outputs (data transfers) as mentioned above, and is also structured not to have delays in response to data input/output requests. The overheads referred to here mean saving or restoring of a context which occurs when task switching is performed. This is to say, the I/O processor 5 is structured to resolve the overheads incurred due to the saving/restoring of an instruction address of the program counter and register data into/from the memory (stack area). The following is a detailed explanation of the structure of the I/O processor 5.

1.3.3.1 The I/O Processor

Figure 11:
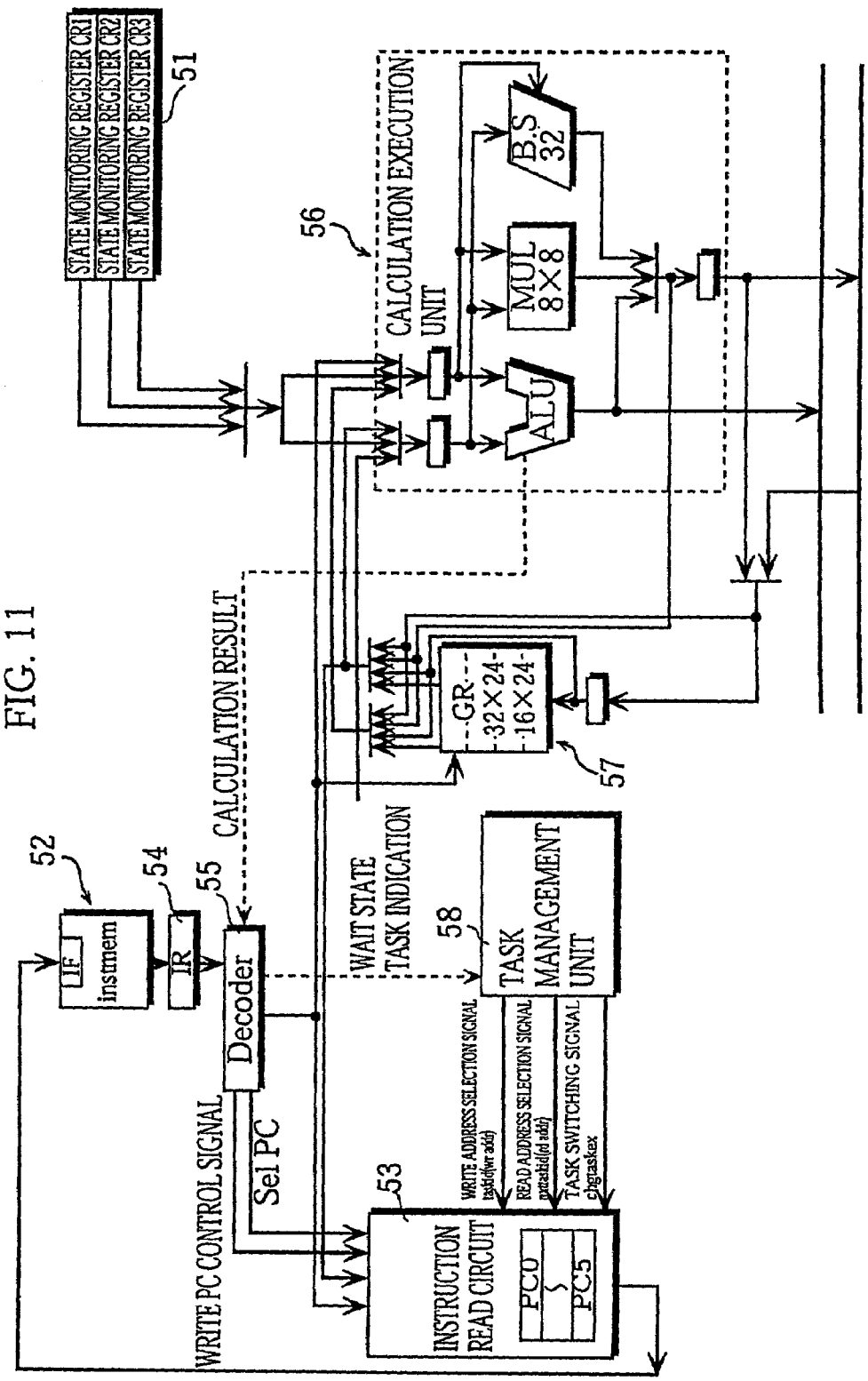
FIG. 11 is a block diagram showing the structure of an I/O processor.

FIG. 11 is a block diagram showing the structure of the I/O processor 5. As shown in FIG. 11, the I/O processor 5 is composed of a state monitoring register 51, an instruction memory 52, an instruction read circuit 53, an instruction register 54, a decoder 55, a calculation executing unit 56, a general register set group 57, and a task management unit 58.

The I/O processor 5 executes task switching at very short intervals (four-instruction cycle, for example) so as to handle a plurality of asynchronous events.

The state monitoring register 51, which is composed of registers CR1 to CR3, stores various sets of state data (such as a flag) so that the I/O processor 5 can monitor various input/output states. For example, the state monitoring register 51 stores sets of state data showing: a state of the stream input unit 1 (a detection flag of a start code in an MPEG stream); a state of the video output unit 12 (a flag indicating a horizontal blanking interval and a flag indicating the completion of a frame data transfer); a state of the audio output unit 13 (a flag indicating the completion of an audio frame data transfer); and a state of data transfers among these units, the buffer memory 2, the external memory 3, and the FIFO memory 4 (the number of data transfers and a flag indicating a data request to the FIFO memory 4).

In detail, the following flags are stored in the state monitoring register 51.

1. The start code detection flag (also referred to as the "flag 1") which is set by the stream input unit 1 when a start code of an MPEG stream is detected by the stream input unit 1.

2. The horizontal blanking flag (also referred to as "the flag 2") which indicates the horizontal blanking interval and is set by the video output unit 12 at intervals of about 60 μsec.

3. The video frame data transfer completion flag (also referred to as "the flag 3") which is set by the DMAC 5a when the decoded image data of one frame is transferred from the external memory 3 to the video output unit 12.

4. The audio frame data transfer completion flag (also referred to as "the flag 4") which is set by the DMAC 5a when the decoded audio data of one frame is transferred from the external memory 3 to the audio output unit 13.

5. The data transfer completion flag (also referred to as "the flag 5") which is set by the DMAC 5a when a determined number of sets of compressed video data, with the number being determined by the I/O processor 5, are transferred from the stream input unit 1 to the buffer memory 2 (that is, the flag 5 is set at the time of a terminal count of the predetermined number of transfers).

6. The DMA request flag (also referred to as "the flag 6") which indicates that there is compressed video data or compressed audio data in the buffer memory 2 to be DMA-transferred to the external memory 3 and which is set by the I/O processor 5 (this flag indicates a DMA-transfer request issued from task(1) to task(2) described later in this specification).

7. The data request flag to the video FIFO (also referred to as "the flag 7") which indicates a data transfer from the external memory 3 to the video FIFO of the FIFO memory 4 and is set at intervals of about 5 μsec to 40 μsec when the amount of the compressed video data in the video FIFO drops below a predetermined amount.

8. The data request flag to the audio FIFO (also referred to as "the flag 8") which indicates a data transfer from the external memory 3 to the audio FIFO of the FIFO memory 4 and is set at intervals of about 15 μsec to 60 μsec when the quantity of the compressed audio data in the audio FIFO drops below a predetermined amount.

9. The decode communication request flag (also referred to as "the flag 9") which requests a communication from the decode processing unit 1002 to the input/output processing unit 1001.

10. The host communication request flag (also referred to as "the flag 10") which requests a communication from the host processor to the input/output processing unit 1001.

These flags are constantly monitored, not as interrupts, by tasks executed by the I/O processor.

The instruction memory 52 stores a plurality of task programs, each of the task programs being in charge of part of the control of ht many data inputs/outputs (data transfers). In the present embodiment, the instruction memory 52 stores six task programs, i.e., tasks from task(0) to task(5).

Task(0) (Host Interface Task)

Task(0) is for a communication processing with the host processor performed via the host interface unit 14 when the flag 10 is set. For example, task(0) includes receiving instructions of start, stop, fast-forward search, and reverse reproduction for the MPEG stream decoding and indicating a decoding state (such as an error occurring state). This processing is triggered by the flag 10.

Task(1) (Parsing Task)

Task(1) is a program which, when the start code is detected by the stream input unit 1 (the flag 1), parses the MPEG data inputted by the stream input unit 1, extracts elementary streams, and transfers the extracted elementary streams to the buffer memory 2 through a DMA transfer (the first half of the stated transfer path(1)). Here, the extracted elementary streams are compressed video data (or, video elementary stream), compressed audio data (or, audio elementary stream), and private data. When the elementary streams are stored in the buffer memory 2, the flag 6 is set.

Task(2) (Stream Transfer/Audio Task)

Task(2) is a program for controlling the following transfers(a) to (c).

(a) The DMA transfer of the elementary streams from the buffer memory 2 to the external memory 3 (the second half of the transfer path(1)). This transfer is triggered by the flags 1 and 3.

(b) The DMA transfer of the compressed audio data from the external memory 3 to the audio FIFO of the FIFO memory 4 (the transfer to the audio FIFO in the transfer path(2)) in accordance with the data size (the remaining amount) of the compressed audio data stored in the audio FIFO. This data transfer is performed when the remaining amount of the compressed audio data stored in the audio FIFO drops below the predetermined data size. This flag is triggered by the flag 8.

(c) The DMA transfer of the decoded audio data from the external memory 3 to the buffer memory 2 and then from the buffer memory 2 to the audio output unit 13 (the transfer path(4)). This transfer is triggered by the flag 2.

Task(3) (Video Supply Task)

Task(3) is a program for performing the DMA transfer of the compressed video data from the external memory 3 to the video FIFO of the FIFO memory 4 in accordance with the data size (the remaining amount) of the compressed video data stored in the video FIFO (the DMA transfer to the video FIFO in the transfer path(2)). This data transfer is performed when the remaining amount of the compressed video data stored in the video FIFO drops below the predetermined amount. This flag is triggered by the flag 7.

Task(4) (Video Output Task)

Task(4) is a program for performing the DMA transfers of the decoded video data from the external memory 3 to the buffer memory 2 and then from the buffer memory 2 to the video output unit 12 (the transfer path(4)). These data transfers are triggered by the flag 2.

Task(5) (Decoder Interface Task)

Task(5) is a program for processing commands issued from the decode processing unit 1002 to the I/O processor 5. Here, the commands are such as "getAPTS (Audio Presentation Time Stamp)", "getVPTS (Video Presentation Time Stamp)", and "getSTC (System Time Clock)". The command "getVPTS" indicates that the decode processing unit 1002 requests the I/O processor 5 to obtain a VPST assigned to the compressed video data. The command "getAPTS" indicates that the decode processing unit 1002 requests the I/O processor 5 to obtain an APTS assigned to the compressed audio data. The command "getSTC" indicates that the decode processing unit 1002 requests the I/O processor 5 to obtain an STC. Receiving these commands, the I/O processor 5 informs the decode processing unit 1002 of the STC, VPTS, and APTS, which are used for a synchronized operation of the audio decoding and the video decoding in the decode processing unit 1002 and for adjustment of the decoding progress in units of frames. This task is triggered by the flag 9.

The instruction read circuit 53, which is composed of a plurality of program counters (the "PCs", hereafter) indicating instruction fetch addresses, fetches an instruction from the instruction memory 52 using the PC specified by the task management unit 58 and then stores the fetched instruction in the instruction register 54. More specifically, the instruction read circuit 53 is composed of the PCs from PC0 to PC5 corresponding to the tasks from task(0) to task(5). When a selected PC is changed by the task management unit 58, the PC is switched at high speed using the hardware. By means of this structure, the I/O processor 5 is released from the processing to save the PC value of the current task into the memory and restore a PC value of a next task from the memory when task switching is performed.

The decoder 55 decodes the instruction stored in the instruction register 54, and controls the calculation executing unit 56 to execute the instruction. In addition, the decoder 55 performs pipeline control on the overall I/O processor 5. The pipeline is composed of at least three stages, i.e., an instruction fetch stage of the instruction read circuit 53, a decode stage of the decoder 55, and an execution stage of the calculation executing unit 56.

The calculation executing unit 56 is composed of an ALU (Arithmetic Logical Unit), a multiplier, and a BS (Barrel Shifter), and executes a calculation indicated by the instruction in accordance with control by the decoder 55.

The general register set group 57 is composed of six register sets corresponding to the tasks from task(0) to task(5), each register set including 4 32-bit registers and 4 16-bit registers. That is, the general register set group 57 is composed of 24 32-bit registers and 24 16-bit registers in total. One of the register sets corresponding to the task which is being currently executed is used. By means of this structure, the I/O processor 5 is released from the processing to save the all current register data into the memory and restore register data of a next task from the memory when task switching is performed.

The task management unit 58 performs the task switching by switching the PC of the instruction read circuit 53 and the register set of the general register set group 57 for every predetermined number of instructions. The predetermined number is four in the present embodiment. The I/O processor 5 executes one instruction in one instruction cycle in the pipeline processing, that is, the task management unit 58 switches the task every four instructions without generating overheads. As a result, response delays to the various asynchronous input/output requests can be reduced. In other words, the response delay to an input/output request is only 24 instruction cycles in the worst possible case.

1.3.3.1.1 The Instruction Read Circuit

Figure 12:
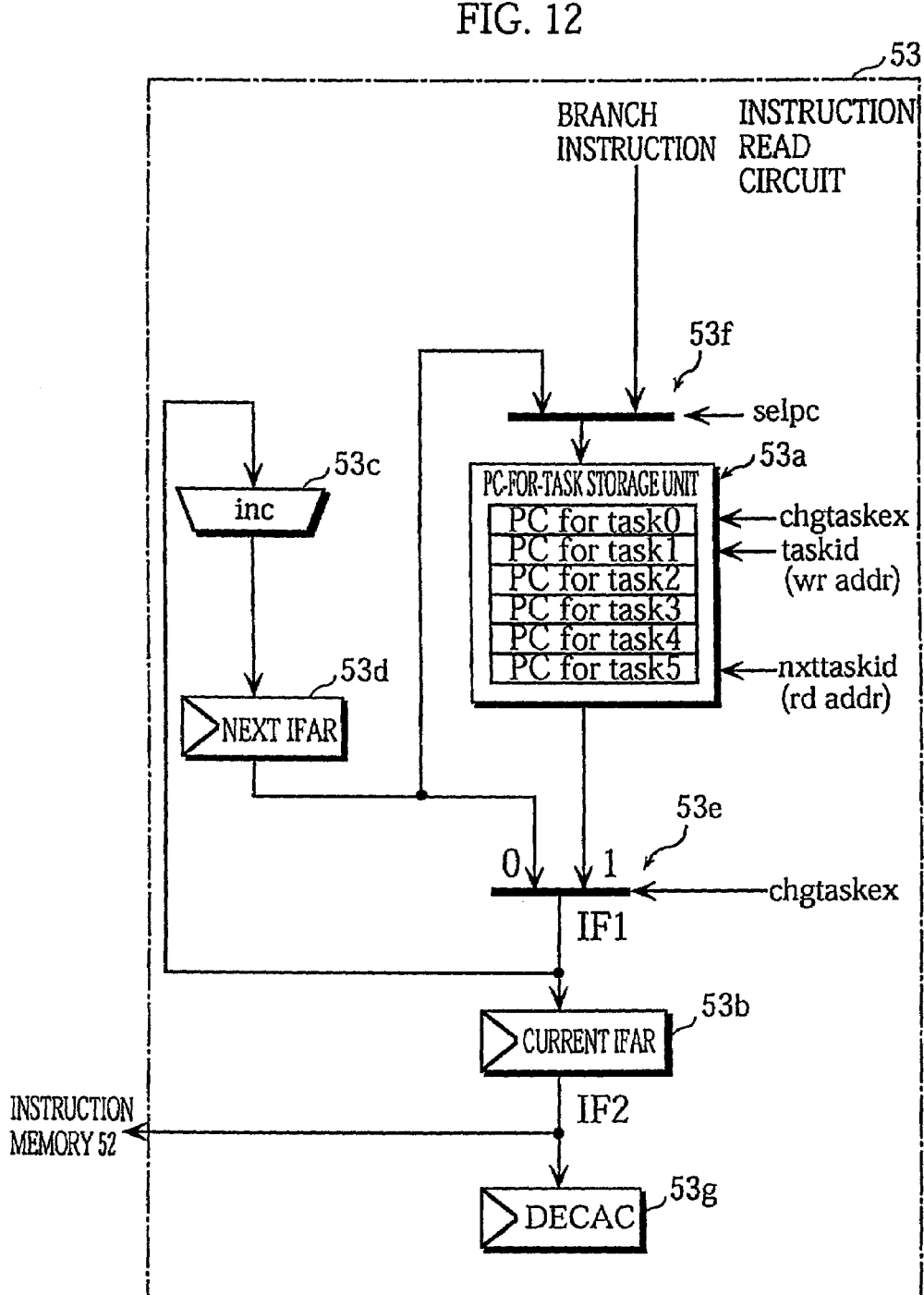
FIG. 12 is a block diagram showing an example of the detailed structure of an instruction read circuit.

FIG. 12 is a block diagram showing an example of the detailed structure of the instruction read circuit 53.

As shown in FIG. 12, the instruction read circuit 53 is composed of a PC-for-task storage unit 53*a*, a current IFAR (Instruction Fetch Address Register) 53*b*, an incrementer 53*c*, a next IFAR 53*d*, a selector 53*e*, a selector 53*f*, and a DECAR (Decode Address Register) 53*g*. The instruction read circuit 53 switches an instruction fetch address without generating overheads when task switching is performed.

The PC-for-task storage unit 53*a* is composed of six address registers corresponding to the tasks from task(0) to task(5), and stores a program count value for each task. Each program count value indicates a resume address of the corresponding task. When task switching is performed, a program count value of a next task to be executed is read from the corresponding address register and the program count value of the task being currently executed is updated to the new resume address in the corresponding address register, in accordance with control by the task management unit 58 and the decoder 55. Here, the task to be next executed and the task being currently executed are respectively designated as a "nxttaskid (rd addr)" signal and a "taskid (wr addr)" signal by the task management unit 58 (hereafter, the "taskid" is also referred to as the "task identifier").

Figure 13:
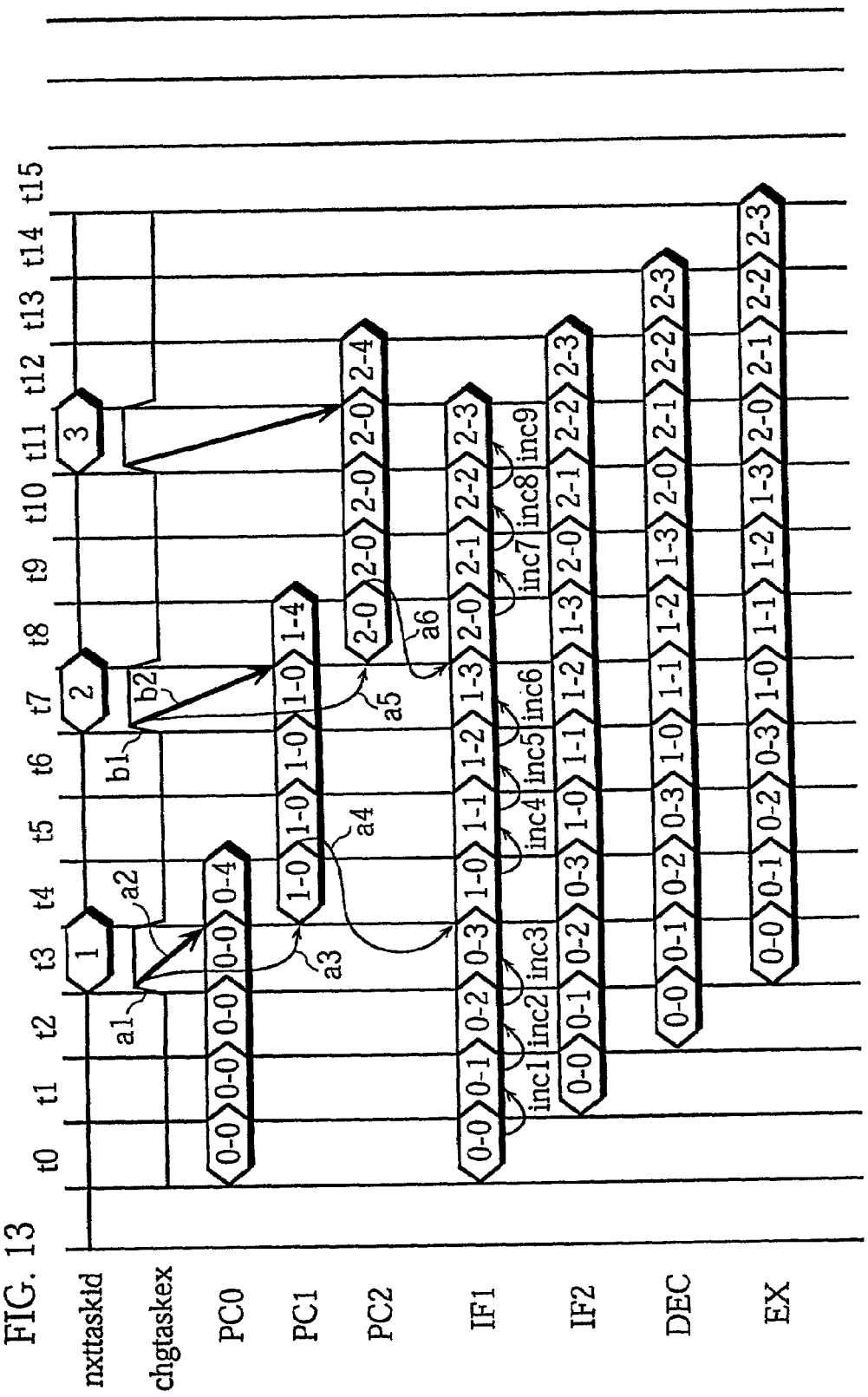
FIG. 13 is a timing chart showing the operation timing of the IQ processor.

The program count values corresponding to the tasks from task(0) to task(2) are shown in the columns of PC0 to PC2 in FIG. 13. The notation "0-0" indicates the instruction 0 of task(0) and the notation "1-4" indicates the instruction 4 of task(1). For example, the program count value of PC0 is read when task(0) is resumed (instruction cycle t0), and the program count value of PC0 is updated to the address of the instruction "0-4" when the task is switched to a next task (instruction cycle t4).

A loop circuit, which is composed of the incrementer 53*c*, the next IFAR 53*d*, and the selector 53*e*, updates the instruction fetch address selected by the selector 53*e*. The address outputted from the selector 53*e* is shown in the IF1 column of FIG. 13. When task(0) is switched to task(1), for example, the selector 53*e* selects the address of the instruction "1-0" read out from the PC-for-task storage unit 53*a* in the cycle t4 and sequentially selects the incremented instruction addresses from the next IFAR 53*d* in the instruction cycles t5 to t7.

The current IFAR 53*b* stores the IF1 address outputted by the selector 53*e* after one cycle delay, and outputs the address as the instruction fetch address to the instruction memory 52. In other words, the current IFAR 53*b* stores an instruction fetch address of a currently active task. The instruction fetch address stored in the current IFAR 53*b* is shown in the IF2 column of FIG. 13. As shown in FIG. 13, the IF2 address is an instruction address of a task which changes every four instruction cycles.

The DECAR 53*g* stores an address of an instruction stored in the instruction register 54, i.e., the address of the instruction which is being currently decoded. In FIG. 13, the address stored in the DECAR 53*g* is shown in the DEC column, and the instruction address being currently executed is shown in the EX column.

The selector 53f selects the branch address when a branch instruction is executed and when an interruption occurs, and, in all other cases, selects the address stored in the next IFAR 53d.

Being provided with the instruction read circuit 53 described above, the I/O processor 5 performs the pipeline processing composed of four stages (IF1, IF2, DEC, and EX stages) as shown in FIG. 13. Of these stages, the IF1 stage is for selecting and updating a plurality of program count values, and the IF2 stage is for fetching an instruction.

1.3.3.1.2 The Task Management Unit

Figure 14:
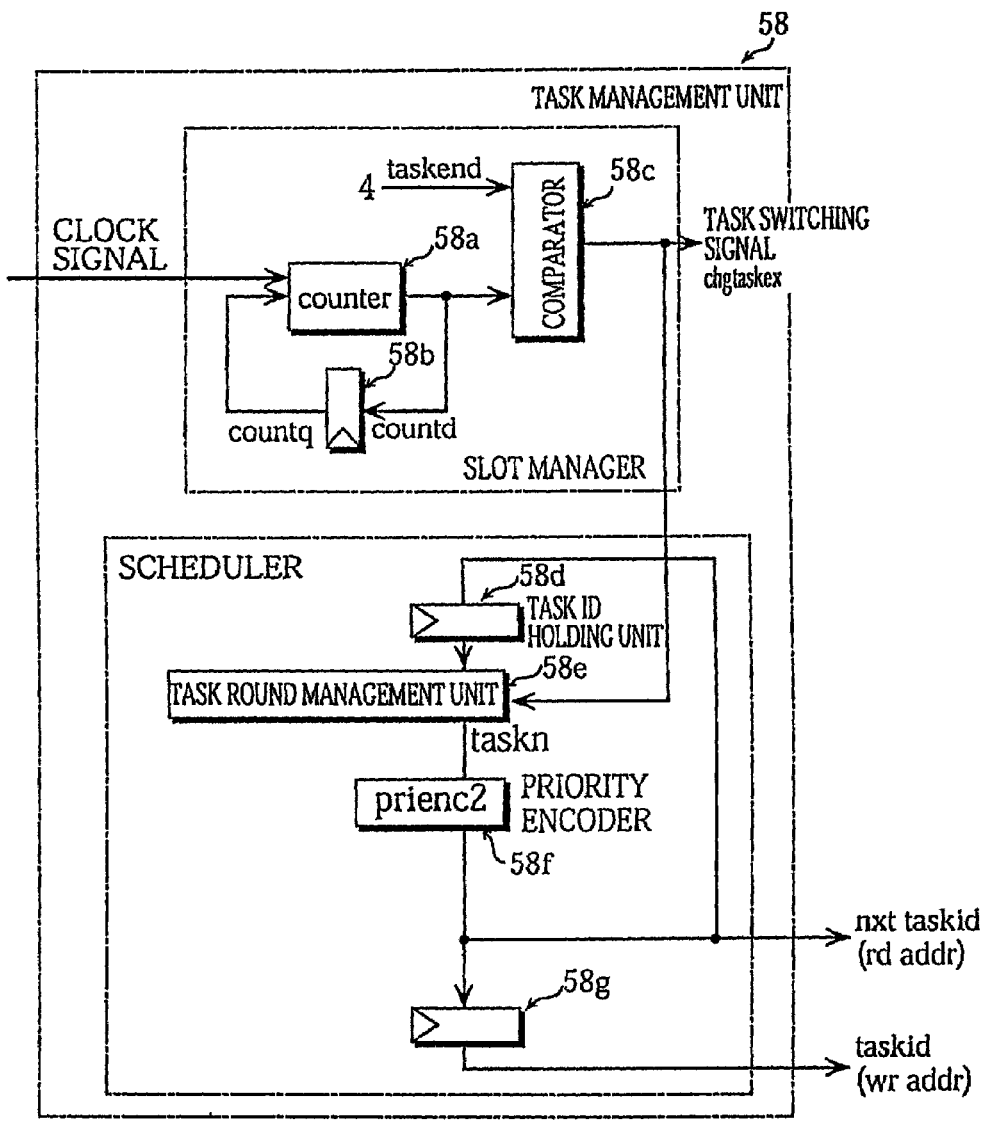
FIG. 14 is a block diagram showing the detailed structure of a task management unit.

FIG. 14 is a block diagram showing the detailed structure of the task management unit 58. As shown in FIG. 14, the task management unit 58 is mainly composed of a slot manager for managing the timing of the task switching and a scheduler for managing the order of the tasks.

The slot manager, which is composed of a counter 58a, a latch 58b, a comparator 58c, and a latch unit 58d, outputs a task switching signal "chgtaskex" indicating the task switching for every four instruction cycles to the instruction read circuit 53.

More specifically, the latch 58b includes two FFs (Flip-Flops) storing the lower 2 bits of the value outputted from the counter 58a. The counter 58a outputs a 3-bit value obtained by incrementing the 2-bit output of the latch 58b by "1" for each clock which shows the instruction cycle. As a result, the counter 58a repeatedly counts 1, 2, 3, 4. The comparator 58c outputs the task switching signal "chgtaskex" to the instruction read circuit 53 and the scheduler when the output value counted by the counter 58a matches the integer value "4".

The scheduler is composed of a task round management unit 58e, a priority encoder 58f, and a latch 58g. The scheduler updates a task identifier "taskid" and outputs a current "taskid" and a next "taskid" to be executed to the instruction read circuit 53 every time the task switching signal "chgtaskex" is outputted.

More specifically, the latch unit 58d and the latch 58g store the current identifier "taskid" in the encoded form (i.e., in a 3-bit value). In this encoded form, the value represents the task identifier "taskid".

When the task switching signal "chgtaskex" is inputted, the task round management unit 58e outputs an identifier "taskid" of a task to be executed in the decoded form (i.e., 6-bit value) by referring to the latch unit 58d. In the decoded form (6-bit value), one bit corresponds to one task and a bit position represents the task identifier "taskid".

The priority encoder 58f translates the task identifier "taskid" outputted by the task round management unit 58e from a decoded form into an encoded form. The latch unit 58d and the latch 58g store the encoded task identifier "taskid" after one cycle delay.

With this structure, when the task switching signal "chgtaskex" is outputted from the comparator 58c, the task round management unit 58e has an identifier of a task to be next executed as the signal "nxttaskid (rd addr)" outputted from the priority encoder 58f and the identifier of the current task as the signal "taskid" (wr addr) outputted form the latch 58g.

1.4 Description of Operations

The following is a description of the operation performed by the media processing apparatus 1000 of the first embodiment.

In the input/output processing unit 1001, MPEG streams asynchronously inputted by the stream input unit 1 are temporarily stored in the external memory 3 via the buffer memory 2 and the memory controller 6 according to control by the I/O processor 5, and then are stored in the FIFO memory 4 via the controller 6. Here, the I/O processor 5 supplies compressed video data and compressed audio data to the FIFO memory 4 in accordance with the size of the remaining data stored in the FIFO memory 4 by executing task(2) (b) and task(3). As a result, the FIFO memory 4 is replenished with a constant suitable amount of compressed video data and audio data. Accordingly, the decode processing unit 1002 can be devoted to the decode processing, regardless of asynchronous inputs/outputs. The processing up to here is performed by the input/output processing unit 1001 independently of and in parallel with the processing performed by the decode processing unit 1002.

Figure 15A:
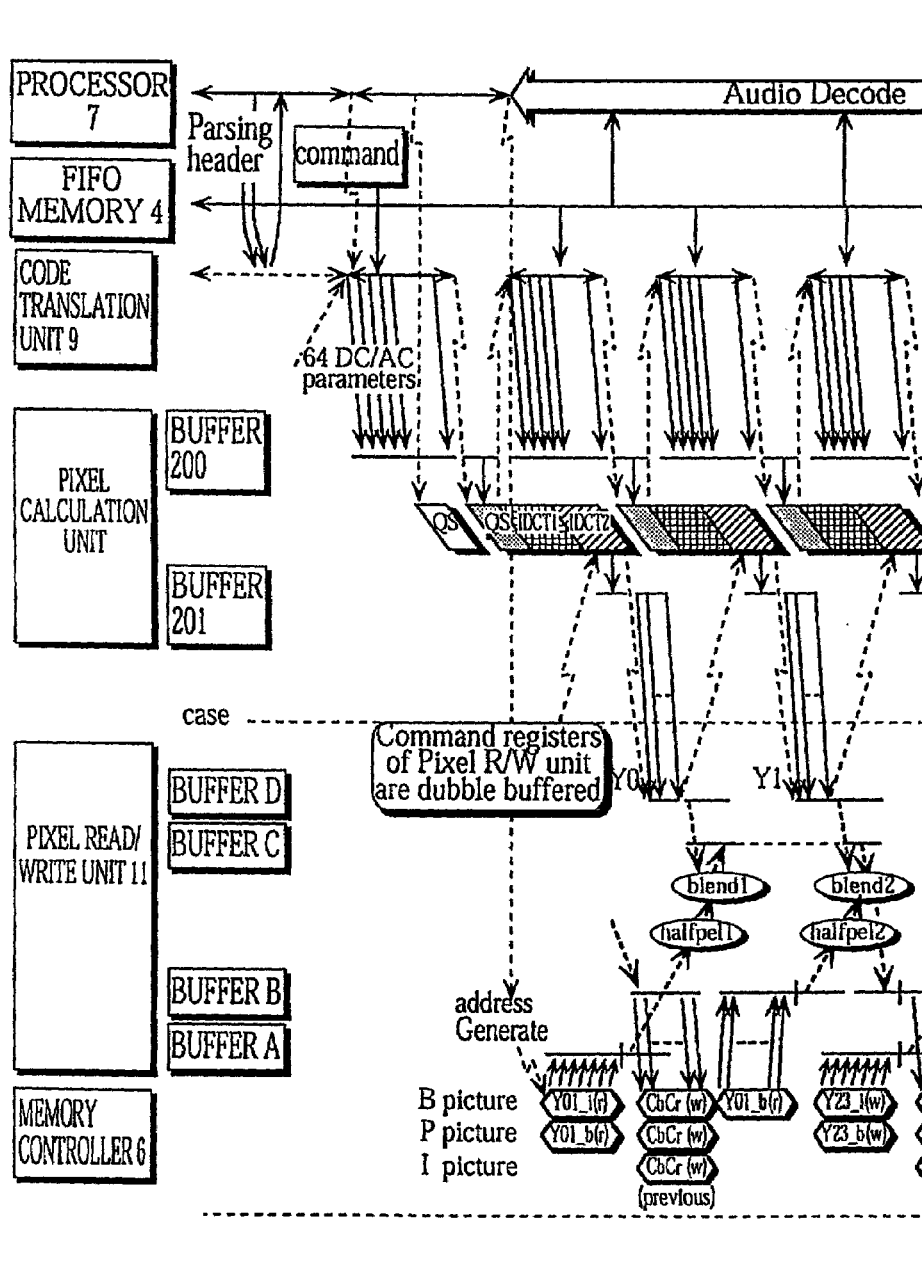
FIGS. 15A and 15B are representations of the decode processing performed by the routine processing unit 1004.
Figure 15B:
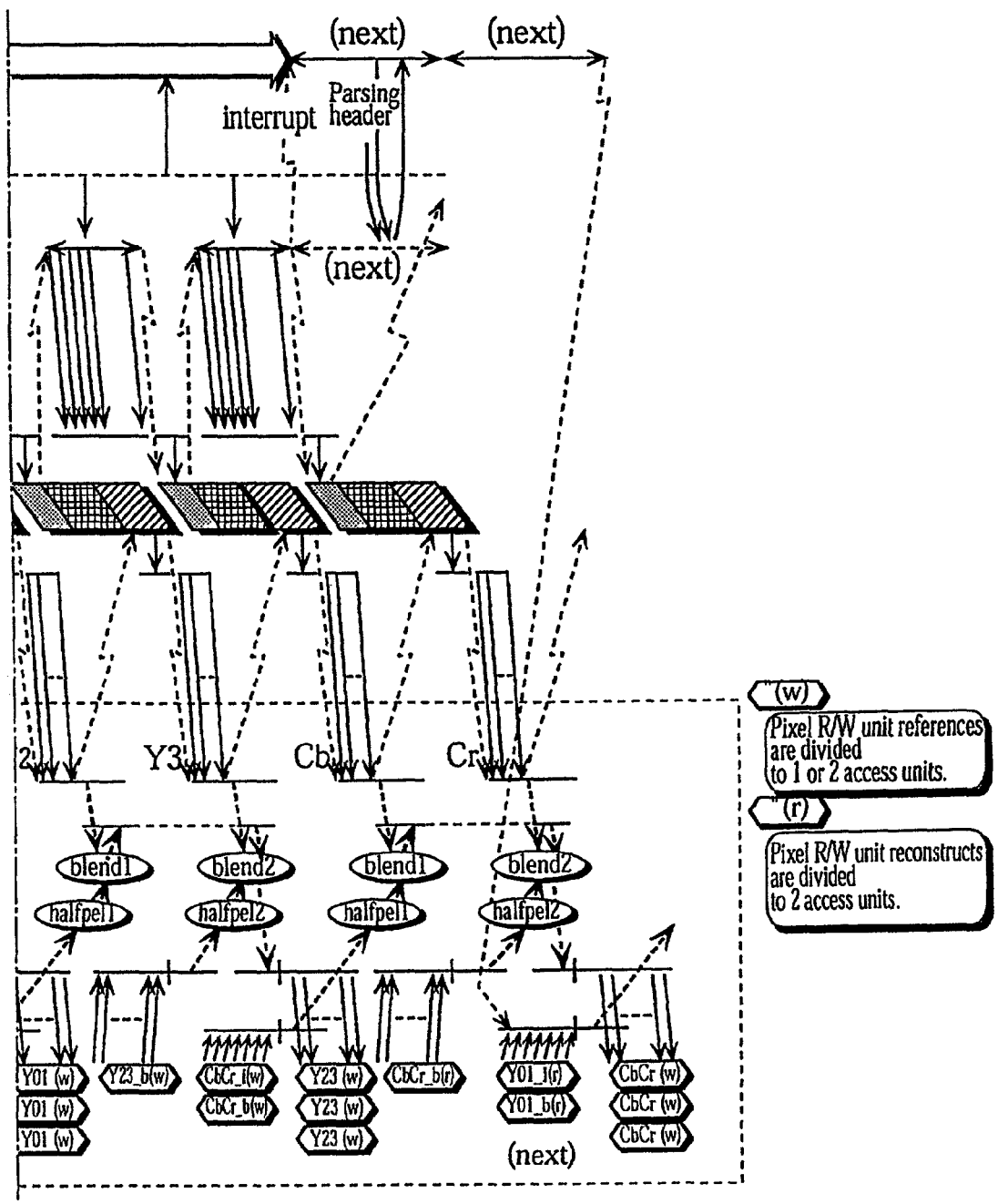

In the decode processing unit 1002, the MPEG stream data stored in the FIFO memory 4 is decoded by the processor 7, the code translation unit 9, the pixel calculation unit 10, and the pixel read/write unit 11. FIGS. 15A and 15B are representations of the decode operation performed by the routine processing unit 1004.

FIGS. 15A and 15B show the header analysis of one macroblock and the decode processing for each block, with the horizontal axis representing time. In the vertical axis, the decode processing for each block executed by the units provided in the decode processing unit 1002 using pipeline processing is shown.

As shown in FIGS. 15A and 15B, the processor 7 repeats the header analysis on the compressed video data and the decode processing on the compressed audio data according to time sharing. That is, the processor 7 performs the header analysis on data of one macroblock and informs the code translation unit 9, the pixel calculation unit 10, and the pixel read/write unit 11 of the analysis result, before instructing the code translation unit 9 to start the decode processing of the macroblock. Then, the processor 7 continues the decode processing of the compressed audio data until an interrupt signal is sent from the code translation unit 9. The decoded audio data is temporarily stored in the internal memory 8, and then is DMA-transferred to the external memory 3 via the memory controller 6.

On being instructed to start the decode processing of the macroblock by the processor 7, the code translation unit 9 stores each block of the macroblock in the buffer 200. For each block, the code translation unit 9 can change the order of the addresses in the buffer 200 in accordance with the block scan type obtained during the header analysis performed by the processor 7. That is, the order of the addresses is changed, depending on whether the scan type is the zigzag scan type or the alternate scan type. Accordingly, the pixel calculation unit 10 does not need to change the order of the read addresses and can always output the addresses in order regardless of the block scan type. The code translation unit 9 repeats the stated operation until the VLD processing on the six blocks of the macroblock is completed, and writes the decoded data of the macroblock into the buffer 200. On the completion of the VLD processing on the six blocks, the code translation unit 9 sends an interrupt signal to the processor 7. This interrupt signal is called an EOMB (End of macroblock) signal, which is generated when the code translation unit 9 detects a sixth EOB (End Of Block) signal.

In parallel with the operation of the code translation unit 9, the pixel calculation unit 10 performs the IQ and IDCT on the block data stored in the buffer 200 in units of blocks and stores the processing result in the buffer 201 as shown in FIG. 9.

In parallel with the operation of the pixel calculation unit 10, the pixel read/write unit 11 extracts rectangle areas of the reference frame from the external memory 3 and performs the blending of the blocks, as shown in FIGS. 15A and 15B, in accordance with the block data stored in the buffer 201 and the motion vectors indicated during the header analysis performed by the processor 7. The result of the block blending is stored in the external memory 3 via the FIFO memory 4.

The above operation is performed when the present macroblock is not a skipped macroblock. In the case where the present macroblock is a skipped macroblock, the code translation unit 9 and the pixel calculation unit 10 do not operate, and only the pixel read/write unit 11 operates. If the present macroblock is a skipped macroblock, this means that the image of the macroblock is the same as the image of the corresponding rectangle area in the reference frame. Therefore, the image of the rectangle area is copied as a decoded image and stored in the external memory 3 by the pixel read/write unit 11.

In this case, an interrupt signal which is sent from the code translation unit 9 to the processor 7 is generated as follows. A logical AND of the following signals is taken: a signal showing that the processor 7 has sent the control signal instructing the pixel read/write unit 11 to perform the MC operation; a signal showing that the pixel read/write unit 11 is available to perform the MC operation; and a signal showing that the present macroblock is a skipped macroblock. The logical OR is then taken for the result of the logical AND and the EOMB signal, and this logical OR is sent as the interrupt signal to the processor 7.

By means of the media processing apparatus of the first embodiment of the present invention described above, the input/output processing unit 1001 performs the input processing for inputting MPEG streams from a storage medium or a communication medium, the output processing for outputting display image data and audio data to the display device and the audio output device, and the supply processing for supplying the streams to the decode processing unit 1002, while the decode processing unit 1002 performs the decode processing on the compressed video and audio data. With this structure, the decode processing unit 1002 can be devoted to the decode processing, and freed from the asynchronous processing. As a result, a series of processes including the input processing, decode processing, and output processing of MPEG streams are efficiently executed, and the full decode processing (with no frames omitted) can be realized without using a processor with high speed operation clock.

For the present media processing apparatus, it is desirable to have the LSI (Large Scale Integration) circuit provided within one chip. In this case, it is possible for the full decode processing to be performed with a 100 MHz clock or below (54 MHz, in practice). Recent high-performance CPUs (Central Processing Units), whose operation clocks exceed 100 MHz or even 200 MHz, can perform the full decode processing in the case where the image size is small, although the manufacturing cost is high. On the other hand, the present media processing apparatus is superior in the cost of manufacturing and the performance of the full decode processing.

In the decode processing unit 1002 of the present media processing apparatus, the processing is shared out as follows.

The processor 7 performs the header analysis which requires the various condition judgements on the compressed video and audio data in addition to performing the decode processing on the compressed audio data. Meanwhile, the special hardware (firmware), which is composed of the code translation unit 9, the pixel calculation unit 10, and the pixel read/write unit 11, takes charge of decoding the block data of the compressed video data where the huge amount of routine calculation is required. As shown in FIGS. 15A and B, the code translation unit 9, the pixel calculation unit 10, and the pixel read/write unit 11 are performed in the pipeline structure. The IQ and IDCT can be performed in parallel by the pixel calculation unit 10. The pixel read/write unit 11 realizes the access to the reference frame in units of two blocks. Accordingly, the decode processing of the compressed video data is efficiently achieved, so that the part of the hardware specifically for the decode processing of the video data can have a high performance without using a high speed clock. More specifically, this hardware for the video data decoding can perform on about a 50 MHz to 60 MHz clock, that is, without using a high speed clock whose frequency exceeds 100 MHz. This performance is almost the same as the performance of conventional media processing apparatuses. Accordingly, no high speed element is required for the present media processing apparatus and the manufacturing cost can thus be reduced.

In addition, for the decode processing of the video data, the processor 7 operates in units of macroblocks, the code translation unit 9 and the pixel calculation unit 10 operates in units of blocks, and the pixel read/write unit 11 operates in units of two blocks. As a result, the buffer capacity for the video decoding can be minimized.

2. The Second Embodiment

A media processing apparatus of the second embodiment is composed of a compressing function (referred to as an "encode processing" hereafter) and a graphics-drawing function in addition to a decode function for decoding compressed stream data.

2.1 The Structure of the Media Processing Apparatus

FIG. 16 is a block diagram showing the structure of the media processing apparatus of the second embodiment of the present invention.

As shown in FIG. 16, the media processing apparatus 2000 is composed of a stream input/output unit 21, a buffer memory 22, a FIFO memory 24, an I/O (Input/Output) processor 25, a memory controller 26, a processor 27, an internal memory 28, a code translation unit 29, a pixel calculation unit 30, a pixel read/write unit 31, a video output unit 12, an audio output unit 13, a buffer 200, and a buffer 201. The media processing apparatus 2000 has the following functions in addition to the those of the media processing apparatus 1000 shown in FIG. 4. These additional functions are the encode function for video and audio data and the graphics-drawing function for polygon data.

As such, the components of the media processing apparatus 2000 which are identified by the same names as the components shown in FIG. 4 have the same functions. In addition to these same functions, the media processing apparatus 2000 is composed of the encode function and the graphics-drawing function. Therefore, the following description focuses on these different functions and the other functions are not explained.

The stream input/output unit 21 differs from the stream input unit 1 in that it performs a two-way operation. More specifically, when the MPEG data is transferred from the buffer memory 22 in accordance with control by the I/O processor 25, the transmitted parallel data is translated into sequential data and the sequential data is then externally outputted as the MPEG data stream.

The buffer memory 22 and the FIFO memory 24 also perform two-way operations in the present embodiment.

The I/O processor 25 controls the transfer paths(5) to (8) described below in addition to the transfer paths(1) to (4) of the first embodiment. The transfer paths are:

(1) the stream input/output unit 21→the buffer memory 22→the memory controller 26→the external memory 3;

(2) the external memory 3→the memory controller 26→the FIFO memory 24;

(3) the external memory 3→the memory controller 26→the buffer memory 22→the video output unit 12; and (4) the external memory 3→the memory controller 26→the buffer memory 22→the audio output unit 13;

(5) the external memory 3→the memory controller 26→the internal memory 28;

(6) the external memory 3→the memory controller 26→the pixel read/write unit 31;

(7) the FIFO memory 24→the memory controller 26→the external memory 3; and (8) the external memory 3→the memory controller 26→the buffer memory 22→the stream input/output unit 21.

The paths (5) and (6) are for video data and audio data which are to be encoded, and the paths(7) and (8) are for the compressed MPEG stream.

The following is a description of the encode processing. Suppose that the data to be encoded is stored in the external memory 3. The video data stored in the external memory 3 is transferred to the pixel read/write unit 31 by the memory controller 26 according to control by the pixel read/write unit 31.

The pixel read/write unit 31 performs differential image generate processing and writes the differential image into the buffer 201. The differential image generate processing includes motion detection for each block (calculation of a motion vector) and generating a differential image. For this processing, the pixel read/write unit 31 includes a motion detection circuit for detecting the motion vector by searching in the reference frame for a rectangle area which correlates most closely to the block that is subjected to the encode processing. It should be noted here that a motion estimate circuit, instead of the motion detection circuit, may be included for estimating the motion vector using the motion vectors of the already-calculated blocks of the preceding and succeeding frames.

The pixel calculation unit 30 receives the differential image data in units of blocks and performs the DCT, IDCT, quantization processing (the "Q processing", hereafter), and IQ. The quantized video data is stored in the buffer 200.

The code translation unit 29 receives the quantized data from the buffer 200, and then performs the VLC (Variable Length Coding) on this received data. After the VLC processing, the data is stored in the FIFO memory 24 and then stored in the external memory 3 via the memory controller 26. Here, the data is assigned header information in units of macroblocks by the processor 27.

The video data stored in the external memory 3 is transferred to the internal memory 28 via the memory controller 26. The processor 27 performs the encode processing on the audio data stored in the internal memory 28 and the processing for assigning the header information in units of macroblocks according to time sharing.

Accordingly, the encode processing is performed in the reverse direction of the processing of the first embodiment.

Next, the graphics processing is explained. The graphics processing is three-dimensional image generate processing which is performed using combinations of polygons. In the present media processing apparatus, pixel data inside a polygon is generated from the pixel data at vertex coordinates of the polygon.

Suppose the vertex data of the polygon is stored in the external memory 3. The vertex data is stored in the internal memory 28 by the memory controller 26 according to control by the processor 27. The processor 27 reads the vertex data from the internal memory 28, performs the preprocessing of DDA (Digital Difference Analyze), and then stores the data in the FIFO memory 24.

The code translation unit 29 reads the vertex data from the FIFO memory 24, and transfers the data to the pixel calculation unit 30 in accordance with an instruction from the pixel calculation unit 30.

The pixel calculation unit 30 performs the DDA processing on the vertex data, which it transmits to the pixel read/write unit 31. The pixel read/write unit 31 performs a Z-buffer processing or an α blending processing on the data and writes this image data into the external memory 3 via memory controller 26 in accordance with an instruction from the processor 27.

2.1.1 The Pixel Calculation Unit

Figure 17:
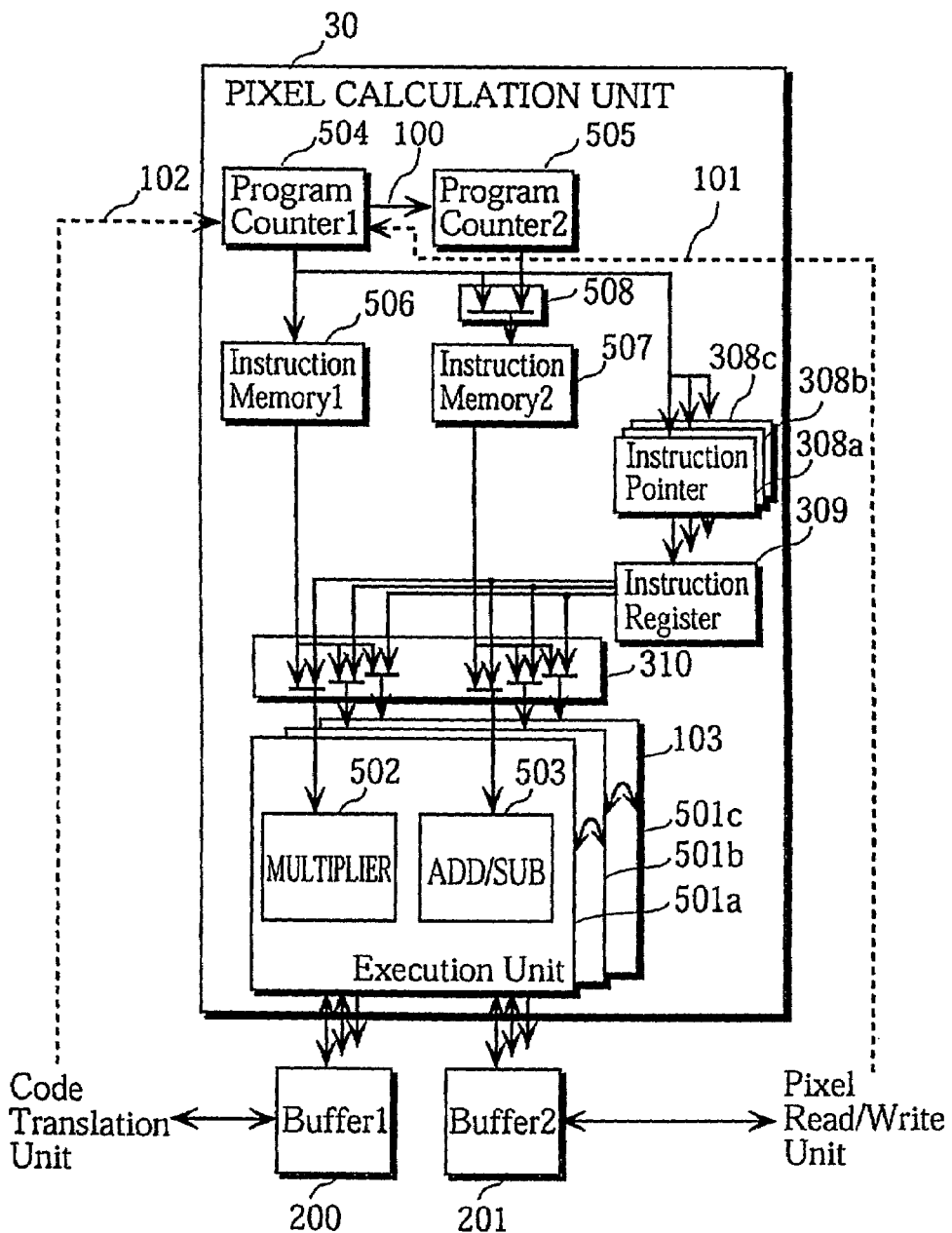
FIG. 17 is a block diagram showing the structure of a pixel calculation unit.

FIG. 17 is a block diagram showing the structure of the pixel calculation unit 30.

In FIG. 17, the same components as the components of the pixel calculation unit 10 shown in FIG. 7 are assigned the same numerals, and therefore, the explanations of these components are omitted. The following description is focused on the different components.

When compared with the pixel calculation unit 10, the pixel calculation unit 30 differs in that it includes three execution units (501a to 501c), and an instruction pointer holding unit 308 and an instruction register unit 309.

By means of the additional execution units 501a to 501c, the calculation performance is improved. More specifically, colors RGB (Red, Green, Blue) are calculated separately and in parallel, for the graphics processing of a color image. The IQ and Q processing is performed at high speed using the three multipliers 502. The IDCT is performed using the multipliers 502 and the adder-subtracters 503, so that the processing time is reduced. In the IDCT, a calculation called a butterfly computation is performed, where all data subjected to the computation have a dependence on each other. As such, a data line 103 for the communications among the execution units 501a to 501c is provided.

Figure 18:
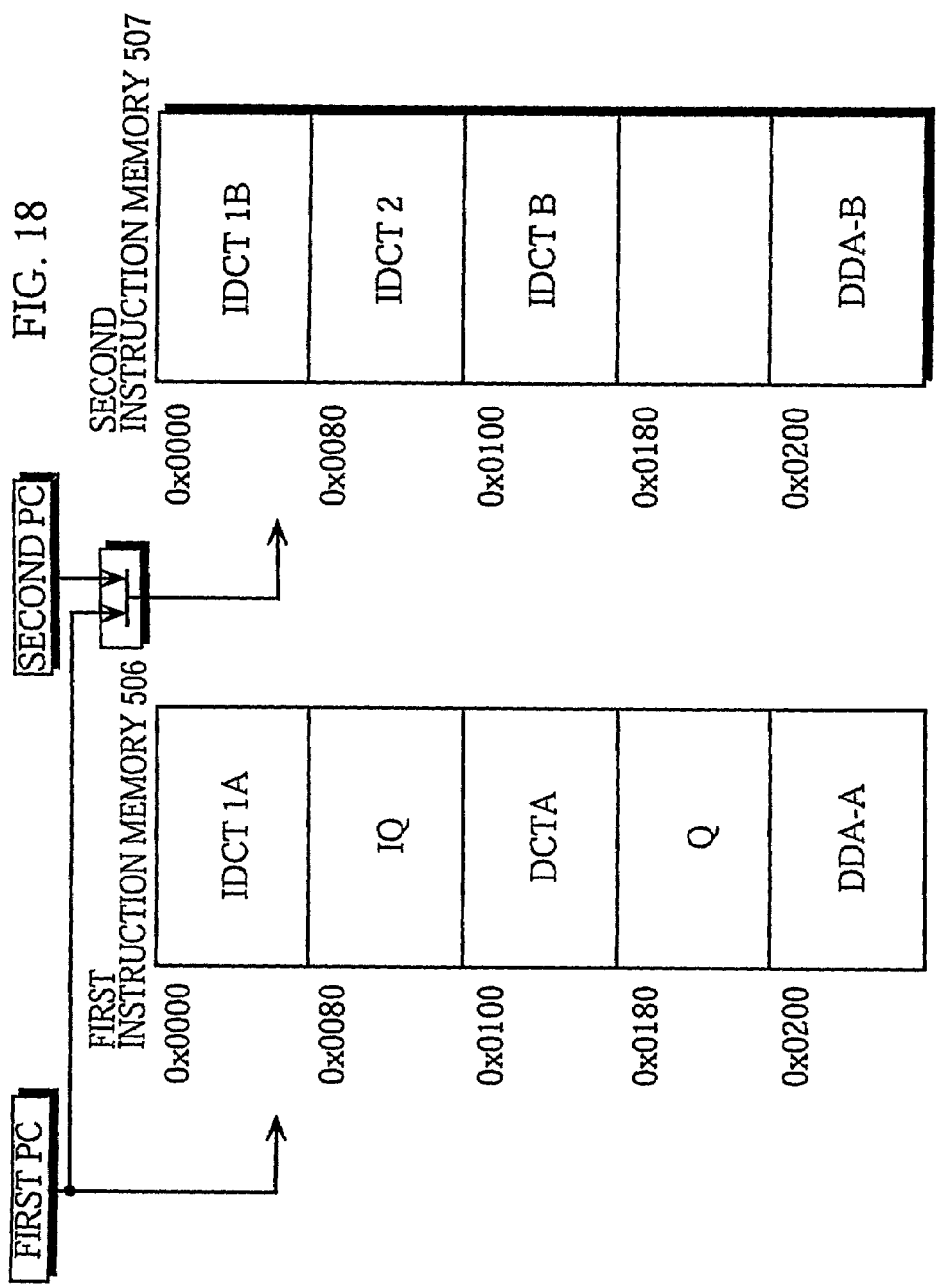
FIG. 18 shows content examples stored in the first instruction memory and the second instruction memory.

The first instruction memory 506 and the second instruction memory 507 stores microprograms for the DCT, Q processing, and DDA in addition to the microprograms for the IDCT and IQ. FIG. 18 shows content examples stored in the first instruction memory 506 and the second instruction memory 507. As can be seen from FIG. 18, a Q processing microprogram, the DCT microprogram, and the DDA microprogram which are not in FIG. 8 are added.

The instruction pointer holding units 308a to 308c are set corresponding to the execution units 501a to 501c, each instruction pointer holding unit having a translation table for translating an address inputted from the first program counter and for outputting the translated address to the instruction register unit 309. The translated address indicates a register number of the instruction register unit 309. The instruction pointer holding units 308a to 308c each have a modify flag (described later in this specification) and each output its modify flag to the corresponding execution units 501a to 501c.

Using the translation tables, the instruction pointer holding units 308a to 308c output the following translated addresses, for example, when the input address is 1, 2, 3, 4, 5, 6, 7, 8, 9, 10, 11, 12:

the instruction pointer holding unit 308a outputs 1, 2, 3, 4, 5, 6, 7, 8, 9, 10, 11, 12;

the instruction pointer holding unit 308b outputs 2, 1, 4, 3, 6, 5, 8, 7, 10, 9, 12, 11; and the instruction pointer holding unit 308c outputs 4, 3, 2, 1, 8, 7, 6, 5, 12, 11, 10, 9.

Figure 23:
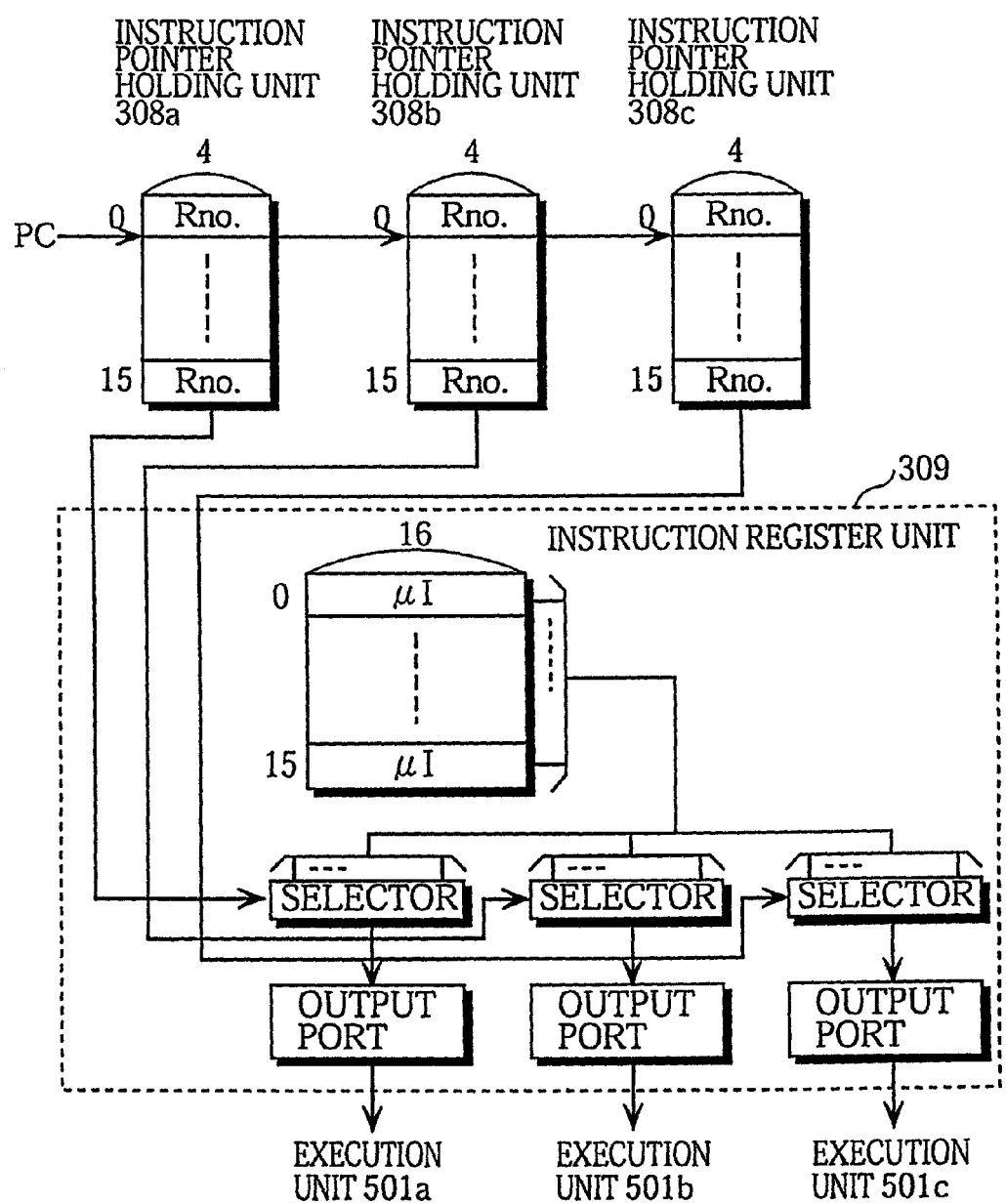
FIG. 23 shows an example of the storage contents of the instruction pointer holding units and the instruction register unit.

As shown in FIG. 23, the instruction register unit 309 is composed of a plurality of registers, three selectors, and three output ports. The plurality of registers respectively hold a microinstruction. The three selectors select the microinstructions of registers designated by the translated addresses (i.e., the register numbers) which are inputted from the instruction pointer holding units 308a to 308c. The three output ports are set corresponding to the selectors, and output the microinstructions selected by the selectors to the execution units 501a to 501c via a distribution unit 310. By means of the three selectors and the three output ports, different microinstructions can be simultaneously supplied to the three adder-subtracters 503 (or the three multipliers 502). In the present embodiment, the three output ports selectively supply the microinstructions to either the three adder-subtracters 503 or the three multipliers 502 via the ago distribution unit 310.

As one example, the instruction register unit 309 is composed of registers R1 to R16 (i.e., the register numbers 1 to 16). The microprogram stored in the registers R1 to R16 executes matrix calculation processing required for the DCT and IDCT, and the same processing is performed regardless of the stated three orders of the register numbers. In other words, this microprogram has three execution orders, and some microinstructions whose execution order is adjustable are rearranged. With this structure, although the execution units 501a to 501c execute the microprogram in parallel, a resource interference, such as a contention of register (not illustrated) access, among the execution units 501a to 501c is avoided. The matrix calculation processing includes a multiplication, inversion, and transmission of a matrix 8 by 8.

The microinstruction stored in each register of the instruction register unit 309 is expressed as "op Ri, Rj, dest, (modify flag)" in mnemonic format. It should be noted here that the microinstruction of the instruction register unit 309 is shown in the parts "op Ri, Rj". The part "(modify flag)" is designated by the instruction pointer holding units 308a to 308c, and the part "dest" is designated by the first instruction memory 506 or the second instruction memory 507.

Here, the "op" is an operation code indicating an instruction, such as a multiplication, addition, subtraction, or transmission, and the "Ri, Rj" are operands. A multiplication instruction is executed by the multipliers 502 of the three execution units 501a to 501c. An addition instruction, a subtraction instruction, or a transmission instruction is executed by the adder-subtracters 503 of the execution units 501a to 501c.

The part "dest" indicates a storage destination of a calculation result. This "dest" is not specified by the registers of the instruction register unit 309, but by the first instruction memory 506 (in the case of a multiplication instruction) and by the second instruction memory 507 (in the case of an addition instruction, subtraction instruction, or transmission instruction). This is because the microprogram of the instruction register unit 309 is shared by the execution units 501a to 501c. If the storage destination is specified by the registers, individual microprograms for the execution units 501a to 501c are required, and this results in the need for a microprogram which is several times larger.

The "modify flag" indicates whether the addition/subtraction instruction is an addition instruction or a subtraction instruction. This "modify flag" is not designated by the registers of the instruction register unit 309, but by the instruction pointer holding units 308a to 308c. Integer matrixes subjected to the matrix calculation of the DCT and IDCT include a row (or a column) where all elements are "1" and a row (or a column) where all elements are "−1". As such, the instruction pointer holding units 308a to 308c designate the "modify flag", so that the instruction register unit 309 can use the same microprogram.

When the three microinstructions inputted from the instruction register unit 309 are addition or subtraction instructions, the distribution unit 310 distributes the parts "op Ri, Rj", the parts "dest" inputted from the first instruction memory 506, and the parts "(modify flag)" inputted from the instruction pointer holding units 308a to 308c to the three adder-subtracters 503. Simultaneously, the distribution unit 310 respectively distributes one microinstruction of the first instruction memory 506 to the three multipliers 502. When the three microinstructions inputted from the instruction register unit 309 are multiplication instructions, the distribution unit 310 distributes the parts "op Ri, Rj" and the parts "dest" inputted from the first instruction memory 506 to the three multipliers 503, and simultaneously distributes one microinstruction of the second instruction memory 507 to the three adder-subtracters 503. This is to say, when the microinstructions distributed to the three adder-subtracters 503 by the distribution unit 310 are the same, one microinstruction is supplied to the three adder-subtracters 503 from the second instruction memory 507. When the microinstructions distributed to the three adder-subtracters 503 are different from each other, the three microinstructions are supplied to the adder-subtracters 503 from the instruction register 309. In the same way, when the microinstructions distributed to the three multipliers 502 are the same, one microinstruction is supplied from the first instruction memory 506. When the multiplication instructions are different from each other, the microinstructions from the instruction register unit 309 are supplied to the three multipliers 502.

With this structure of the pixel calculation unit 30, the storage capacity of the first instruction memory 506 and the second instruction memory 507 can be reduced.

If the pixel calculation unit 30 is not composed of the instruction pointer holding units 308a to 308c, the instruction register unit 309, and the distribution unit 310, the first instruction memory 506 and the second instruction memory 507 need to store the three microinstructions in parallel to supply the different microinstructions to the three execution units 501a to 501c.

Figure 22:
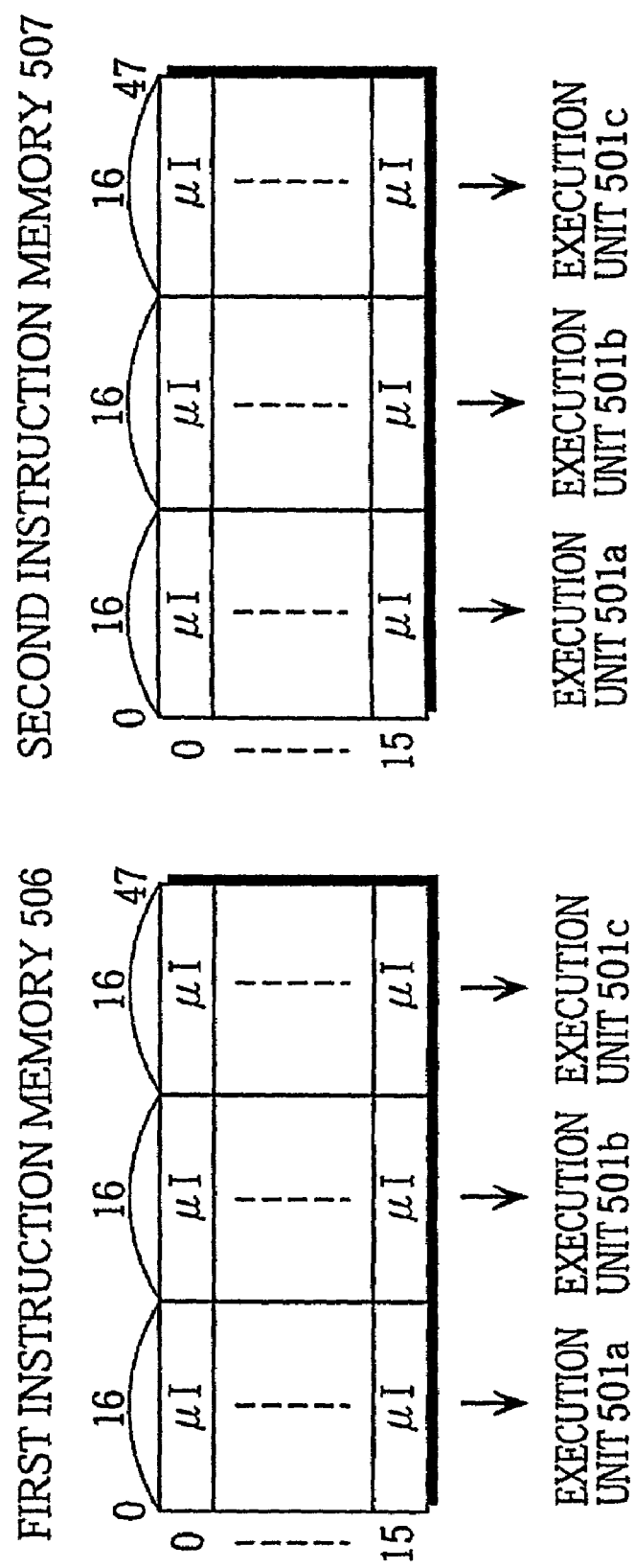
FIG. 22 shows an example of storage contents of the first instruction memory and the second instruction memory in the case where the pixel calculation unit does not include the instruction pointer holding units, the instruction register unit, and the distribution unit.

FIG. 22 shows an example of storage contents of the first instruction memory 506 and the second instruction memory 507 in the case where the pixel calculation unit 30 is not composed of the instruction pointer holding units 308a to 308c, the instruction register unit 309, and the distribution unit 310. As shown in FIG. 22, a microprogram composed of 16 steps is stored, with one microinstruction being 16 bits long. In this case, the first instruction memory 506 and the second instruction memory 507 store three microinstructions in parallel, so that a storage capacity of 1,536 bits (16 steps×16 bits×3×2) is required.

Meanwhile, FIG. 23 shows an example of storage contents of the instruction pointer holding units 308a to 308c and the instruction register unit 309 provided in the pixel calculation unit 30 of the present embodiment. As is the case shown in FIG. 22, a microprogram composed of 16 steps is stored, with one microinstruction being 16 bits long. As shown in FIG. 23, the instruction pointer holding units 308a to 308c respectively store 16 register numbers (each register number being 4 bits long), and the instruction register 309 stores 16 microinstructions. In this case, the storage capacity of the instruction pointer holding units 308a to 308c and the instruction register unit 309 may be 448 bits (16 steps×(12+16)). As a result, the storage capacity of the pixel calculation unit 30 for the microprogram can be considerably reduced. In reality, the "dest" and "(modify flag)" are separately specified, so that storage capacity or a circuit is still required for this data. The first instruction memory 506 and the second instruction memory 507 designate the "dest" of the microinstruction and issue one multiplication instruction and one addition/subtraction instruction to the execution units 501a to 501c, so that the first instruction memory 506 and the second instruction memory 507 are not completely eliminated. If six instruction pointer holding units and six output ports for the instruction register 309 are set, it is possible to eliminate the first instruction memory 506 and the second instruction memory 507.

It should be noted here that although the instruction pointer holding units 308a to 308c output the translated addresses (i.e., the register numbers) when a value of the first program counter is one of the values from "0" to "15" in FIG. 23, the present invention is not limited to this. For example, the translated addresses may be outputted when the value of the first program counter is one of the values from "32" to "47". In this case, an appropriate offset value may be added to the value of the first program counter. Accordingly, an arbitrary address row indicated by the first program counter can be translated into translated address.

With the stated structure of the media processing apparatus, not only the decode processing on the compressed video and audio data, but also the encode processing on the video and audio data and the graphics processing based on the polygon data can be performed in the present embodiment. The plurality of execution units operate in parallel, so that the processing can be performed with high efficiency. In addition, some microinstructions are rearranged depending on the instruction register units 309a to 309c to avoid the resource interference among the plurality of execution units, and this also improves the processing efficiency.

It should be noted here that the media processing apparatus of the present embodiment includes the three execution units since this allows the three colors RGB to be separately calculated. The number of the execution units may be three or more.

It is desirable to realize the LSI circuit for each of the media processing apparatuses 1000 and 2000 with one chip. In addition, although the external memory 3 is provided outside the chip in the first and second embodiments, it may be provided in the chip.

In the stated embodiments, although the stream input unit 1 and the stream input/output unit 21 store MPEG streams (or, AV data) in the external memory 3, the host processor may directly store the MPEG streams (or, AV data) in the external memory 3.

Moreover, although the I/O processor 5 performs task switching every four instruction cycles, another number of cycles may be used. Also, the number of instruction cycles for task switching may be assigned beforehand for each task, so that the number of instruction cycles are different for each task. Also, the number of instruction cycles may be assigned for each task in response to priorities and urgencies.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A media processing apparatus which inputs a data stream including compressed audio data and compressed video data, decodes data in the inputted data stream, and respectively outputs the decoded audio data and the decoded video data to an external display device and an external audio output device, the media processing apparatus comprising:
    an input/output processing unit operable to perform an input/output processing, asynchronously occurring due to an external factor,
    wherein the input/output processing unit is composed of:
    an input unit operable to input an asynchronous data stream;
    a video output unit operable to output the decoded video data to the external display device;
    an audio output unit operable to output the decoded audio data to the external audio output device; and
    a processor for executing task programs from a first task program through a fourth task program stored in an instruction memory, by switching between the respective four task programs, the task programs including:
    the first task program for transferring the data stream from the input unit to the memory;
    the second task program for supplying the data stream from the memory to a decode processing unit;
    the third task program for outputting the decoded video data from the memory to the video output unit; and
    the fourth task program for outputting the decoded audio data from the memory to the audio output unit,
    the media processing apparatus further comprising:
    the decode processing unit operable, in parallel with the input/output processing, to perform a decode processing where decoding of the data stream stored in the memory is mainly performed,
    wherein the decoded video data and the decoded audio data are stored in the memory.

2. The media processing apparatus of claim 1, herein the processor is composed of:
    a program counter unit including at least four program counters corresponding to the task programs from the first task program to the fourth task program;
    an instruction fetch unit for fetching an instruction from the instruction memory which stores the task programs, using an instruction address designated by one of the program counters;
    an instruction execution unit for executing the instruction fetched by the instruction fetch unit; and
    a task control unit for controlling the instruction fetch unit to sequentially switch the program counter every time a predetermined number of instruction cycles have elapsed.

3. The media processing apparatus of claim 2, wherein the processor is further composed of
    a register unit including at least four register sets corresponding to the program tasks from the first task program to the fourth task program, and wherein the task control unit, simultaneously with switching of a program counter, switches a present register an to a register set which is to be used by the instruction execution unit.

4. The media processing apparatus of claim 3 wherein the task control unit is composed of:
a counter for counting a number of instruction cycles in accordance with a clock signal every time the program counter is switched; and
a switch instruction unit for controlling the instruction fetch unit to switch the program counter when a count value of the counter reaches the predetermined number.

5. The media processing apparatus of claim 4, wherein the decode processing unit is composed of: a sequential processing unit operable to perform a sequential processing, which is mainly for condition judgments, on the data in the data stream, the sequential processing including a header analysis of the compressed audio data and the compressed video data and a decoding of the compressed audio data; and
a routine processing unit operable to perform a routine processing in parallel with the sequential processing, the routine processing including a decoding of the compressed video data except for the header analysis.

6. The media processing apparatus of claim 5,
wherein the sequential processing unit alternates between performing a header analysis for analyzing a header which is assigned to a predetermined unit of data (hereinafter, called a "block") in the data stream and performing a decoding of the compressed audio data in the data stream, instructs the routine processing unit to decode a block when the header analysis for the block is completed, and starts the header analysis of a next block when receiving notification from the routine processing unit that the decoding of the block is completed; and
wherein the routine processing unit decodes the compressed video data for a block in accordance with a result of the header analysis given by the sequential processing unit.

7. The media processing apparatus of claim 6, wherein the routine processing unit is composed of:
a data translation unit operable to perform nriable length code decoding (abbreviated as the "VLD" hereafter) on the compressed video data of the data stream in accordance with an insflcdon from the sequential processing unit;
a calculation unit operable to perform inverse quantization (abbreviated as the "IQ" hereafter) and inverse discrete cosine fransformation (abbreviated as the "IDCT" hereafter) by executing a predetermined calculation on a video block obtained through the VLD; and
a blending unit operable to restore video block data which corresponds to the video block by blending a decoded rectangular image of a frame stored in the memory with the video block data on which the IDCT has been performed.

8. The media processing apparatus of claim 7, wherein the calculation unit includes
a first buffer having a storage area whose capacity is equivalent to one block, and
wherein the data translation unit includes:
a VLD unit operable to perform the VLD on the compressed video data of the data stream;
a first address table unit operable to store a first address sequence where addresses in the first buffer are arranged in an order for a zigzag scan;
a second address table unit operable to store a second address sequence where addresses in the first buffer are arranged in an order for an alternate scan; and
a writing unit operable to write block data obtained through the VLD performed by the VLD unit into the first buffer in accordance with one of the first address sequence and the second address-sequence.

9. The media processing apparatus of claim 8, wherein the writing unit includes:
a table address generate unit operable to sequentialiy generate a table address for the first address table unit and the second address table unit;
an address select unit operable to sequentially select one of an address of the first address sequence and an address of the second address sequence which are separately outputted from the first table unit and the second table unit into which the table address bus been inputted; and
an address output unit operable to sequentially output the selected address to the first buffer.

10. A media processing apparatus comprising:
an input unit operable to input a data strem including compressed audio data and compressed video data;
a sequential procesang unit operable to perform a sequential processing which is mainly for condition judgments, the sequential processing including performing a header analysis for analyzing a header which is assigned to a predetermined unit of data (hereinafter called a "block") in the data stream and performing a decoding of compressed audio data of the data stream; and
a routine processing unit operable to perform, in parallel with the sequential processing, a routine processing which is mainly for routine calculations, the routine processing including a decoding of the compressed video data of the data steam tbr a block using a result of the header analysis,
wherein the routine processing unit is composed of:
a data translation unit operable to perform variable length code decoding (abbreviated as the "VLD" hereafter) on the compressed video data of the data steam in accordance with an instruction from the sequential processing unit;
a calculation unit operable to perform inverse quantization (abbreviated as the "IQ" hereafter) and inverse discrete cosine fransformation (abbreviated as the "IDCT" hereafter) by executing a predetermined calculation on a video block obtained through the VLD; and
a blending unit operable to restore video block data by performing motion compensation processing which is achieved by blending the decoded block with the video block on which the IDCT has been performed, and
wherein the sequential processing unit is composed of:
an obtaining unit operable to obtain header information on which the VLD has been performed by the data translation unit;
an analyzing unit operable to analyze the obtained header information;
a notifying unit operable to report parameters obtained as a result of the header analysis to the routine processing unit;
an audio decoding unit operable to decode the compressed audio data of the data team inputted by the input unit; and
a control unit operable to stop an operation of the audio decoding unit and activating the obtaining unit that indicates a decode completion of the block and for instructing the data translation unit to start the VLD on the comprised video data of the data stream when the parameters have been indicated by the notifying unit.

11. The media processing apparatus of claim 10, wherein the analyzing unit calculates a quantization scale and a motion vector in accordance with the header information, and wherein the notifying unit notifies the calculation unit of the quantization scale and notifies the blending unit of the motion vector.

12. The media processing apparatus of claim 11, wherein the calculation unit is composed of:
   a first control storage unit and a second control storage unit which each store a microprogram;
   first program counter for designating a first read address to the first control storage unit;
   a second program counter for designating a second read address;
   a selector for selecting one of the first read address and the second read address and outputting the selected read address to the second control storage unit; and
   an execution unit, which includes a multiplier and an adder, for executing the IQ and IDCT in block units according to microprogram control by the first control storage unit and the second control storage unit.

13. The media processing apparatus of claim 12, wherein the execution unit separately performs a processing using the multiplier and a processing using the adder in parallel when the second read address is selected by the selector, and performs the processing using the multiplier and the processing using the adder in coordination when the first read address is selected by the selector.

14. The media processing apparatus of claim 13, wherein the calculation unit is further composed of:
   a first buffer for holding a video block inputted from the data translation unit; and
   a second buffer for holding a video block on which the IDCT has been performed by the execution unit, and
   wherein the first control storage unit stores a microprogram for the IQ and a microprogram for the IDCT, wherein the second control storage unit stores a microprogram for the IDCT and a microprogram for transferring a video block on which the IDCT has been performed to the second buffer, and
   wherein the execution unit executes a processing to transfer the video block on which the IDCT has been performed to the second buffer and the IQ processing of a next video block in parallel, and executes the IDCT processing of the next video block on which the IQ processing has been performed, using the multiplier and the adder in coordination.

15. The media processing apparatus of claim 14, wherein the blending unit further generates a differential block representing a differential image from video data which is to be compressed;
   wherein the second buffer stores the generated differential block,
   wherein the first control storage unit further stores a microprogram for discrete cosine transformation (abbreviated as the "DCT" hereafter) and a microprogram for quantization processing (abbreviated as the "Q processing" hereafter), wherein the second control storage unit further stores a microprogram for the DCT and a microprogram for transferring the video block on which the DCT has been performed to the first buffer,
   wherein the execution unit further executes the DCT and Q processing on the differential block stored in the second buffer and transfers the differential block on which the DCT and Q processing has been performed to the first buffer,
   wherein the data translation unit further performs variable length coding (abbreviated as the "VLC" hereafter) on the block stored in the first buffer, and
   wherein the sequential processing unit further assigns header information to a block on which the VLD bas been performed by the data translation unit.

16. The media processing apparatus of claim 12, wherein the input unit further inputs polygon data, wherein the sequential processing unit further analyzes the polygon data and calculates vertex coordinates and edge inclinations of the polygon, and
   wherein the routine processing unit further generates image data of the polygon in accordance with the calculated vertex coordinates and edge inclinations.

17. The media processing apparatus of claim 16, wherein the first control storage unit and the second control storage unit each store a microprogram for performing a scan conversion based on a digital differential analyze algorithm, and
   wherein the execution unit performs the scan conversion based on the vertex coordinates and edge inclinations calculated by the sequential processing unit according to control of the microprogram.

18. The media processing apparatus of claim 11, wherein the calculation unit is composed of:
   a first control storage unit and the second control storage unit for respectively storing a microprogram;
   a first program counter for designating a first read address to the first control storage unit;
   a second program counter for designating a second read address;
   a selector for selecting one of the first read address and the second read address and outputting the selected address to the second control storage unit; and
   a plurality of execution units for executing the IQ and IDCT in units of blocks according to control of the microprogram by the first control storage unit and the second control storage unit, each execution unit including a multiplier and an adder, and
   wherein each execution unit takes charge of a partial block which is divided from the block.

19. The media processing apparatus of claim 18, wherein the calculation unit is further composed of:
   a plurality of address translation tables which are set corresponding to the plurality of execution units, each address translation table storing translated addresses whose order is partially changed in a predetermined address sequence;
   an instruction register group including a plurality of registers which each store a microinstruction associated with one of the translated addresses, each microinstruction forming part of a microprogram that realizes a predetermined calculation; and
   a switching unit, which is set between the first and second control storage units and the plurality of execution units, for outputting microinstructions from the instruction registers to the plurality of execution units in place of a microinstruction outputted from one of the first control storage unit and the selector to every execution unit, and
   wherein when the first read address or the second read address is an address of the predetermined address sequence, the address is translated into the translated addresses by the address translation tables, and wherein the instruction register group outputs the microinstructions corresponding to the translated addresses outputted from the address translation tables.

20. The media processing apparatus of claim 19, wherein when a microinstruction indicating one of an addition or subtraction operation is outputted from one of the instruction registers, each address translation table outputs a flag showing whether the microinstruction indicates an addition or a subtraction while the first program counter is outputting the first read address in the predetermined address sequence, the plurality of execution units perform addition or subtraction in accordance with the flag, and the flag in set in accordance with the microinstruction of the second control storage unit.

21. The media processing apparatus of claim 19, wherein the second control storage unit further outputs information showing a storage destination of a microinstruction execution result at a same time of an output of the microinstruction stored in the register while the first program counter outputs the first read address of the predetermined address sequence, and wherein each execution unit stores the execution result in accordance with the storage destination information.

22. A media processing apparatus which inputs a data stream including compressed audio/video (AV) data, decodes the inputted stream data, and outputs the decoded data, the media processing apparatus comprising:

an input/output processing unit operable to perform input/output processing in which a plurality of input/output-related tasks, including a task for storing a data stream asynchronously inputted due to an external factor in a memory, are executed, the plurality of input/output-related tasks being switched at predetermined intervals;

a sequential processing unit operable to perform a sequential processing mainly for condition judgments, the sequential processing including a header analysis of the compressed audio data and the compressed video data and a decoding of the compressed audio data, whereby the decoded audio data is stored in the memory; and a routine processing unit operable to perform a routine processing mainly for routine calculations on the compressed video data stored in the memory in accordance with a result of the header analysis given by the sequential processing unit, the routine processing including a decoding of the compressed video data, whereby the decoded video data is stored in the memory, and wherein the plurality of input/output-related tasks further include a task for reading the decoded audio data and the decoded video data from the memory and respectively outputting the read audio data and the read video data, wherein the header analysis is a header analysis of a macroblock including a plurality of video blocks.

23. The media processing apparatus of claim 22, wherein the sequential processing unit alternates between performing a header analysis for analyzing a header which is signed to a predetermined unit of data (hereinafter, called a "block") in the data stream and performing a decoding of the compressed audio data in the data stream, instructs the routine processing unit to decode a block when the header analysis for the block is completed, and an the header analysis of a next block when receiving notification from the routine processing unit that the decoding of the block is completed; and wherein the routine processing unit decodes the compressed video data for a block in accordance with a result of the header analysis given by the sequential processing unit.

24. The media processing apparatus of claim 23, wherein the routine processing unit in composed of:

a data translation unit operable to perform variable length code decoding (abbreviated as the "VLD" hereafter) on the compressed video data of the data steam in accordance with instruction from the sequential processing unit;

a calculation unit operable to perform inverse quantization (abbreviated as the "IQ" hereafter) and inverse discrete cosine transformation (abbreviated as the "IDCT" hereafter) by executing a predetermined calculation on a video block obtained through the VLD; and a blending unit operable to restore video block data which corresponds to the video block by blending a decoded rectangular image of a frame stored in the memory with the video block data on which the IDCT has been performed.

25. The media processing apparatus of claim 24, wherein the calculation unit includes:

a first buffer having a storage area whose capacity is equivalent to one block, and wherein the data translation unit includes:

a VLD unit for performing the VLD on the compressed video data of the data stream;

a first address table unit operable to store a first address sequence where addresses in the first buffer are arranged in an order for zigzag scan;

a second address table unit operable to store a second address sequence where addresses in the first buffer are arranged in an order for an alternate scan; and a writing unit operable to write block data obtained through the VLD performed by the VLD unit into the first buffer in accordance with one of the first address sequence and at the second address sequence.

26. The media processing apparatus of claim 25, wherein the writing unit includes:

a table address generate unit operable to sequentially generate a table address for the first address table unit and the second address table unit;

an address select unit operable to sequentially select one of an address of the first address sequence and an address of the second address sequence which are separately outputted from the first table unit and the second table unit into which the table address has been inputted; and an address output unit operable to output the selected address to the first buffer.

27. The media processing apparatus of claim 22, wherein the input/output processing unit is composed of:

an input unit operable to input an asynchronous data stream;

a video output unit operable to output the decoded video data to the external display device;

an audio output unit operable to output the decoded audio data to the external audio output device; and a processor for executing task programs from a first task program to a fourth task program stored in an instruction memory, by switching between the four task programs, the task programs including:

the first task program for transferring the data stream from the input unit to the memory;

the second task program for supplying the data stream from the memory to the decode processing unit;

the third task program for outputting the decoded video data from the memory to the video output unit; and the fourth task program for outputting the decoded audio data from the memory to the audio output unit, wherein the first, second, third, and fourth tasks an the plurality of input-output-related tasks.

28. The media processing apparatus of claim 27, wherein the processor is composed of:

a program counter unit including at least four program counters corresponding to the task programs from the first task program to the fourth task program;

an instruction fetch unit for fetching an instruction from the instruction memory which stores the task programs, using an instruction address designated by one of the program counters;

an instruction execution unit for executing the instruction fetched by the instruction fetch unit; and a task control unit for controlling the instruction fetch unit to sequentially switch the program counter every time a predetermined number of instruction cycles have elapsed.

29. The media processing apparatus of claim 28, wherein the processor is further composed of a register unit including at least four register sets corresponding to the program tasks from the first task program to the fourth task program, and wherein the task control unit, simultaneously with switching of a program counter, switches a present register set to a register set which is to be used by the instruction execution unit.

30. The media processing apparatus of claim 29, wherein the task control unit is composed of:

a counter for counting a number of instruction cycles in accordance with a clock signal every time the program counter is switched; and a switch instruction unit for controlling the instruction fetch unit to switch the program counter when a count value of the counter reaches the predetermined number.

31. The media processing apparatus of claim 29, wherein the routine processing unit is composed of:

a data translation unit operable to perform variable length code decoding (abbreviated as the "VLD" hereafter) on the compressed video data of the data stream in accordance with an instruction from the sequential processing unit;

a calculation unit operable to perform inverse quantization (abbreviated as the "IQ" hereafter) and inverse discrete cosine transformation (abbreviated as the "IDCT" hereafter) by executing a predetermined calculation on a video block obtained through the VLD; and a blending unit operable to restore video block data which corresponds to the video block by blending a decoded rectangular image of a frame stored in the mommy with the video block data on which the IDCT has been performed.

32. The media processing apparatus of claim 31, wherein the analyzing unit calculates a quantization scale and a motion vector in accordance with the header information, and wherein the notifying unit notifies the calculation unit of the quantization scale and notifies the blending unit of the motion vector.

33. The media processing apparatus of claim 32, wherein the calculation unit is composed of:

a first control storage unit and a second control storage unit which each store a microprogram;

a first program counter for designating a first read address to the first control storage unit;

a second program counter for designating a second read address;

a selector for selecting one of the first read address and the second read address and outputting the selected read address to the second control storage unit; and an execution unit, which includes a multiplier and an adder, for executing the IQ and IDCT in block units according to microprogram control by the first control storage unit and the second control storage unit.

34. The media processing apparatus of claim 33, wherein the execution unit separately performs a processing using the multiplier and a processing using the adder in parallel when the second read address is selected by the selector, and performs the processing using the multiplier and the processing using the adder in coordination when the first read address is selected by the selector.

35. The media processing apparatus of claim 34, wherein the calculation unit is further composed of a first buffer for holding a video block inputted from the data translation unit; and a second buffer for holding a video block on which the IDCT has been performed by the execution unit, and wherein the first control storage unit stores a microprogram for the IQ and a microprogram for the IDCT, wherein the second control storage unit stores a microprogram for the IDCT and a microprogram for transferring a video block on which the IDCT has been performed to the second buffer, and wherein the execution unit executes a processing to transfer the video block on which the IDCT has been performed toe to second buffer and the IQ processing of a next video block in parallel, and executes the IDCT processing of the next video block, on which the IQ processing has been performed, using the multiplier and the adder, in coordination.

36. The media processing apparatus of claim 35, wherein the blending unit further generates a differential block representing a differential image hum video data which is to be compressed;

wherein the second buffer stores the generated differential block, wherein the first control storage unit further stores a microprogram for discrete cosine transformation (abbreviated as the "DCT" hereafter) and a microprogram for quantization processing (abbreviated as the "Q processing" hereafter), wherein the second control storage unit further stores a microprogram for the DCT and a microprogram for transferring the video block on which the DCT has been performed to the first buffer, wherein the execution unit further executes the DCT and Q processing on the differential block stored in the second buffer and transfers the differential block on which the DCT and Q processing has been performed to the first buffer, wherein the data translation unit further performs variable length coding (abbreviated as the "VLC" hereafter) on the block stored in the first buffer, and wherein the sequential processing unit further assigns header information to a block on which the VLD baa been performed by the data translation unit.

37. The media processing apparatus of claim 32, wherein the calculation unit is composed of:
a first control storage unit and the second control storage unit for respectively storing a microprogram;
a first program counter fix designating a first read address to the first control storage unit;
a second program counter for designating a second read address;
a selector for selecting one of the first read address and the second read address and outputting the selected address to the second control storage unit, and
a plurality of execution units for executing the IQ and IDCT in units of blocks according to control of the microprogram by the first control storage unit arid the second control, storage unit, each execution unit including a multiplier and an adder, and
wherein each execution unit take charge of a partial block which is divided from the block.

38. The media processing apparatus of claim 37, wherein the calculation unit is further composed of:
a plurality of address translation tables which are set corresponding to the plurality of execution units, each address translation table storing translated addresses whose order is partially changed in a predetermined address sequence;
an instruction register group including a plurality of registers which each store a microinstruction associated with one of the translated addresses, each microinstruction forming part of a microprogram that realizes a predetermined calculation; and
a switching unit, which is set between the first and second control storage units and the plurality of execution units, for outputting microinstructions from the instruction registers to the plurality of execution units in place of a microinstruction outputted from one of the first control storage unit and to selector to every execution unit, and
wherein when the first read address or the second read address is an address of the predetermined address sequence, the address is translated into the translated addresses by the address translation tables, and
wherein the instruction register group outputs the microinstructions corresponding to the translated addresses outputted from to address translation tables.

39. The media processing apparatus of claim 38, wherein when a microinstruction indicating one of an addition or subtraction operation is outputted from one of the instruction registers, each address translation table outputs a flag showing whether the microinstruction indicates an addition or a subtraction while the first program counter is outputting the first read address in the predetermined address sequence,
the plurality of execution units perform addition or subtraction in accordance with the flag, and
the flag is set in accordance with the microinstruction of the second control storage unit.

40. The media processing apparatus of claim 38,
wherein the second control storage unit further outputs information showing a storage destination of a microinstruction execution result at a same time of an output of the microinstruction stored in the register while the first program counter outputs the first read address of the predetermined address sequence, and
wherein each execution unit stores the execution result in accordance with the storage destination information.

41. The media processing apparatus of claim 31,
wherein the calculation unit includes
a first buffer having a storage area whose, capacity is equivalent to one block, and
wherein the data translation unit includes:
a VLD unit operable to perform the VLD on the compressed video data of the data stream;
a first address table unit operable to store a first address sequence where addresses in the first buffer are arranged in an order for a zigzag scan;
a second address table unit operable to store, second address sequence what addresses in the first buffer are arranged in an order for an alternate scan; and
a writing unit operable to write block data obtained through the VLD performed by the VLD unit, into the first buffer in accordance with one of the first address sequence and the second address sequence.

42. The media processing apparatus of claim 38, wherein the writing unit includes:
a table address generate unit operable to sequentially generate a table address for the first address table unit and the second address table unit;
an address select unit operable to sequentially select one of an address of the first address sequence and an address of the second address sequence which are separately outputted from the fist table unit and the second table unit into which the table address has been inputted; and
an address output unit openable to output the selected address to the first buffer.

43. The media processing apparatus of claim 42,
wherein the analyzing unit operable to calculate a quantization scale-and a motion vector in accordance with the header information, and
wherein the notifying unit notifies the calculation unit of the quantization scale and notifies the blending unit of the motion vector.

44. The media processing apparatus of claim 43, wherein the calculation unit is composed of:
a first control storage unit and a second control storage unit which each store a microprogram;
a first program counter for designating a first read address to the first control storage unit;
a second program counter for designating a second read address;
a selector for selecting one of the first read address and the second read address and outputting the selected read address to the second control storage unit; and
an execution unit, which includes a multiplier and an adder, for executing the IQ and IDCT in block units according to microprogram control by the first control storage unit and the second control storage unit.

45. The media processing apparatus of claim 44,
wherein the execution unit separately performs a processing using the multiplier and a processing using the adder in parallel when the second read address is selected by the selector, and performs the processing using the multiplier and the processing using the adder in coordination when the first read address is selected by the selector.

46. The media processing apparatus of claim 45,
wherein the calculation unit is further composed of
a second buffer for holding a video block on which the IDCT has been performed by the execution unit, and
wherein the first control storage unit stores a microprogram for the IQ and a microprogram for the IDCT, wherein the second control storage unit stores a microprogram for the IDCT and a microprogram for transferring a video block on which to IDCT has been performed to the second buffer, and wherein the execution unit executes a processing to transfer the video block on which the IDCT has been performed, using to the second buffer and the IQ processing of a next video block in parallel, and executes the IDCT processing of the next video block, on which the IQ processing has been performed, using the multiplier and the adder in coordination.

47. The media processing apparatus of claim 46, wherein the blending unit further generates a differential block representing a differential image from
video data which is to be compressed;

wherein the second buffer stores the generated differential block, wherein the first control storage unit further stores a microprogram for discrete cosine transformation (abbreviated as the "DCT" hereafter) and a microprogram for quantization processing (abbreviated as the "Q processing" hereafter), wherein the second control storage unit further stores a microprogram for the DCT and a microprogram for transferring the video block on which the DCT has been preformed to the first buffer, wherein the execution unit further executes the DCT and Q processing on the differential block stored in the second buffer and transfers the differential block on which the DCT ad Q processing baa been performed to the first buffer, wherein the data translation unit further performs variable length coding (abbreviated as the "TLC" hereafter) on the block stored in the first buffer, and wherein the sequential processing unit further assigns header information to a block on which the VLD has been performed by the data translation unit.

48. The media processing apparatus of claim 43,
wherein the calculation unit is composed of:
a first control storage unit and the second control storage unit for respectively storing a microprogram;
a first program counter for designating a first read address to the first control storage unit;
a second program counter for designating a second read address;
a selector for selecting one of the first read address and the second read address and outputting the selected address to the second control storage unit; and
a plurality of execution units for executing the IQ and IDCT in units of blocks according to control of the microprogram by the first control storage unit and the second control storage unit, each execution unit including multiplier and an adder, and wherein each execution unit takes charge of a partial block which is divided flow the block.

49. The media processing apparatus of claim 48, wherein the calculation unit is further composed of:
a plurality of address translation tables which are set corresponding to the plurality of execution units, each address translation table storing translated addresses whose order is partially changed in a predetermined address sequence;
an instruction register group including a plurality of registers which each store a microinstruction associated with one of the translated addresses, each microinstruction forming part of a microprogram that realizes a predetermined calculation; and
a switching unit, which is set between the first and second control storage units and the plurality of execution units, for outputting microinstructions from the instruction registers to the plurality of execution unite in place of a microinstruction outputted from one of the first control storage unit and the selector to every execution unit, and wherein when the first read address or the second read address is an address of the predetermined address sequence, the address is translated into the translated addresses by the address translation tables, and wherein the instruction register group outputs the microinstructions corresponding to the translated addresses outputted from the address translation tables.

50. The media processing apparatus of claim 49, wherein when a microinstruction indicating one of an addition or subtraction operation is outputted from one of the instruction registers, each address translation table outputs a flag showing whether the microinstruction indicates an addition or a subtraction while the first program counter is outputting the first read address in the predetermined address sequence, the plurality of execution units perform addition or
subtraction in accordance with the flag, and
the flag is set in accordance with the microinstruction of the second control storage unit.

51. The media processing apparatus of claim 49,
wherein the second control storage unit further outputs information showing a storage destination of a microinstruction execution result at a same time of an output of the microinstruction stored in the register while the first program counter outputs the first read address of the predetermined address sequence; and
wherein each execution unit stores the execution result in accordance with the storage destination information.

* * * * *

UNITED STATES PATENT AND TRADEMARK OFFICE
CERTIFICATE OF CORRECTION

PATENT NO. : 7,079,583 B2
APPLICATION NO. : 10/007248
DATED : July 18, 2006
INVENTOR(S) : Kosuke Hirai It is certified that error appears in the above-identified patent and that said Letters Patent is hereby corrected as shown below:

In the Claims:
Column 33, line 2, "an" should be --set--.
Column 33, line 42, "nriable" should be --variable--.
Column 33, line 45, "insfledon" should be --instruction--.
Column 33, line 47, "fransformation" should be --transformation--.
Column 34, line 10 "sequentialiy" should be --sequentially--.
Column 34, line 17, "bus" should be --has--.
Column 34, line 24, "procesang" should be --processing--.
Column 34, line 36, "steam tbr" should be --stream for--.
Column 34, line 41, "steam" should be --stream--.
Column 34, line 45, "fransformation" should be --transformation--.
Column 34, line 64, "team" should be --stream--.
Column 35, line 3, "comprised" should be --compressed--.
Column 35, line 16, --a-- should be inserted at the beginning before the word "first".
Column 35, line 51, a comma --,-- should be inserted after the word "block".
Column 36, line 10, "bas" should be --has--.
Column 37, line 62, "signed" should be --assigned--.
Column 37, line 67, "an" should be --starts--.
Column 38, line 11, "steam" should be --stream--.
Column 38, line 12, the word --an-- should be inserted after "with".
Column 39, line 9, "an" should be --are--.
Column 39, line 58, "mommy" should be --memory--.
Column 40, line 39, "toe to" should be --to the--.
Column 40, line 46, "hum" should be --from--.
Column 41, line 2, "baa" should be --has--.
Column 41, line 8, "fix" should be --for--.
Column 41, line 17 "arid" should be --and--.
Column 41, line 20, "take" should be --takes--.
Column 41, line 39, "to" should be --the--.
Column 41, line 47, "to" should be --the--.
Column 42, line 3, the comma "," after "whose" should be deleted.
Column 42, line 12, "what" should be --where--.
Column 42, line 26, "fist" should be --first--.
Column 43, line 29, "openable" should be --operable--.
Column 43, line 2, "to" should be --the--.
Column 43, line 6, ", using" should be deleted.

UNITED STATES PATENT AND TRADEMARK OFFICE
CERTIFICATE OF CORRECTION

PATENT NO. : 7,079,583 B2
APPLICATION NO. : 10/007248
DATED : July 18, 2006
INVENTOR(S) : Kosuke Hirai It is certified that error appears in the above-identified patent and that said Letters Patent is hereby corrected as shown below:

Column 43, line 24, "preformed" should be --performed--.
Column 43, line 28 "baa" should be --has--.
Column 44, line 2, "flow" should be --from--.
Column 44, line 18, "unite" should be --units--.
Column 44, line 47, the semicolon ";" should be a comma --,--.

Signed and Sealed this

Nineteenth Day of December, 2006

JON W. DUDAS
*Director of the United States Patent and Trademark Office*